United States Patent
Saikawa et al.

(10) Patent No.: US 6,509,896 B1
(45) Date of Patent: Jan. 21, 2003

(54) IMAGE PROCESSOR, IMAGE PROCESSING METHOD, MEDIUM AND GAME MACHINE

(75) Inventors: Mitsuharu Saikawa, Tokyo (JP); Shinichi Ogasawara, Tokyo (JP); Hirotsugu Kobayashi, Tokyo (JP); Tetsuo Shinyu, Tokyo (JP); Yuji Sugimori, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/180,166

(22) PCT Filed: Mar. 3, 1998

(86) PCT No.: PCT/JP98/00880
§ 371 (c)(1),
(2), (4) Date: Nov. 3, 1998

(87) PCT Pub. No.: WO98/39738
PCT Pub. Date: Sep. 11, 1998

(30) Foreign Application Priority Data

| Mar. 3, 1997 | (JP) | 9-047547 |
| May 9, 1997 | (JP) | 9-119985 |
| Jul. 11, 1997 | (JP) | 9-185639 |
| Aug. 27, 1997 | (JP) | 9-230992 |

(51) Int. Cl.[7] .............................................. G06T 15/00
(52) U.S. Cl. ...................................................... 345/419
(58) Field of Search ........................... 345/419; 463/35; 369/63

(56) References Cited

U.S. PATENT DOCUMENTS

| 5,435,554 A | * | 7/1995 | Lipson | 273/88 |
| 5,790,713 A | * | 8/1998 | Kamada et al. | 382/285 |
| 5,999,185 A | * | 12/1999 | Kato et al. | 345/420 |
| 6,020,876 A | * | 2/2000 | Rosenberg et al. | 345/157 |
| 6,160,551 A | * | 12/2000 | Naughton et al. | 345/339 |

FOREIGN PATENT DOCUMENTS

| JP | 5324793 A | * | 12/1993 | G06F/15/62 |
| JP | 6-36688 | | 2/1994 | |
| JP | 6-79060 | | 3/1994 | |
| JP | 2178244 A | * | 7/1995 | A63F/9/22 |
| JP | 7-178244 | | 7/1995 | |
| JP | 8-71252 | | 3/1996 | |
| JP | 8071252 A | * | 3/1996 | A63F/9/22 |
| JP | 8-89661 | | 4/1996 | |
| JP | 8117440 A | * | 5/1996 | A63F/9/22 |
| JP | 8-117440 | | 5/1996 | |

OTHER PUBLICATIONS

Excerpt Translation of "Virtua Fighter" Game Manual (Sega Enterprises, Ltd., 1993), P.6, 1.4–17; P.13; 1.2–5.

* cited by examiner

Primary Examiner—Mark Zimmerman
Assistant Examiner—Lance W. Sealey
(74) Attorney, Agent, or Firm—Keating & Bennett, LLP

(57) ABSTRACT

The invention provides an image processing unit for a shooting game in which suitable images can be displayed according to a given situation, and in which more exciting and easy-to-manipulate images are displayed. Coordinate values for objects in three-dimensional virtual space are established on the basis of prerecorded object shape data, view point positions are established on the basis of distances x1 and x2 from predetermined objects defined in; three-dimensional virtual space (for example, the positions are lower when the distance is shorter, and higher when the distance is longer), the coordinate values established as described above are received, and the coordinate values are converted to a visual field coordinate system as seen from the view points established in the manner described above.

10 Claims, 31 Drawing Sheets

| 1 PLAYER | | 2 PLAYER |
|---|---|---|
| A | ENEMY | |
| B% | HIT RATE | |
| C | TECHNICAL SHOT | |
| D% | MAGAZINE EFFCIENCY | |
| E | EVENT CLEAR | |

IMAGE PROCESSOR, IMAGE PROCESSING METHOD, MEDIUM AND GAME MACHINE

TECHNICAL FIELD

This device relates to an image processing unit and image processing method for generating images seen from a specific view point in three-dimensional virtual space, relates to a game machine featuring the use of this image processing unit and image processing method, and also relates to a medium on which is recorded a program for executing the image processing method. The present invention also relates to a game machine equipped with a stereo sound effects system.

BACKGROUND ART

Game machines featuring the use of computer graphics include game machines in which a gun is used to kill enemies (such as "Virtual Cop," by Sega Enterprises). This type of game can be enjoyed by a single player or by several players.

Problem 1

This type of game machine requires exciting images as well as images which can be surveyed in their entirety for the sake of playability. For example, when an enemy approaches, his trajectory should be shown and he should be displayed up close. In conventional game machines, players are individually rated, even in the case of multiple players, making collaborator between players irrelevant.

An object of the present invention is to resolve such drawbacks by providing an image processing unit displaying images that are more playable and more exciting.

An object of the present invention is also to provide a game machine allowing collaborative play between players to be rated.

Problem 2

In this type of game machine, the player wears headphones to experience sounds recorded in the binaural format or the like according to a predetermined storyline.

In this system (game machine), a simple stereo sound effects system can be constructed using a recording format in which speakers are positioned at the player's ear level.

However, the player experiences prerecorded sounds with this format, which is unsuitable for video games and the like in which situations change in real time. Moreover, wearing headphones on the head while playing games is cumbersome and annoying for players.

There are also stereo sound effects systems in which the sound signals that are input to left and right front speakers are processed and sent to left and right rear speakers, but realistic sounds are difficult to reproduce since two sound sources are distributed to the rear.

In view of the foregoing, the object of the present invention is achieved by providing a stereo sound effects game system in which realistic stereo sound effects featuring sounds that change as situations change in real time can be experienced without headphones.

DISCLOSURE OF THE INVENTION

The present invention comprises shape memory in which object shape data are prerecorded, a processing component for establishing coordinate values for objects in three-dimensional virtual space based on the shape data stored in the aforementioned shape memory, conversion means for receiving the coordinate values established by the aforementioned processing component, and for converting the coordinate values to a visual field coordinate system based on a prescribed view point, view point establishment means for establishing the position of the aforementioned view point on the basis of the situation between an object serving as a predetermined reference and other objects defined in three-dimensional virtual space, and for sending the position to the aforementioned conversion means, and imaging means for adding predetermined texture to the shape data of the visual field coordinate system converted by the aforementioned conversion means.

The representation of an object along the z axis in virtual 3D space is inherently a matter of simple magnification and shrinkage. Although the trajectory tends to be representable only along the x axis, depending on the situation between objects, not only can the view point be elevated when the object is at a distance, for example, and lowered when the object is nearer to more powerfully represent the trajectory of the object on the y axis, but the position of the object on the z axis can be represented by the height of the view point.

The present invention is such that the aforementioned view point establishment means elevates the position of the aforementioned view point when the distance between the aforementioned objects is greater, and lowers the position of the aforementioned view point when the distance between the aforementioned objects is shorter.

The present invention is also such that the aforementioned view point establishment means lowers the position of the aforementioned view point when a first process has been executed between the aforementioned objects, and elevates the position of the aforementioned view point when a second process has been executed between the aforementioned objects.

In the present invention, the aforementioned first process is a process establishing the pitching path for a pitcher in a baseball game, and the aforementioned second process is the process of the pitch by the pitcher.

The present invention is also such that the aforementioned view point establishment means directs the line of vision from the aforementioned view point in the direction of the position of a predetermined object in three-dimensional virtual space.

The present invention furthermore comprises a first step for establishing the coordinate values of objects in three-dimensional virtual space on the basis of prerecorded object shape data, a second step for establishing the position of the view point on the basis of the situation between predetermined objects defined in three-dimensional virtual space, a third step for receiving the coordinate values established in the aforementioned first step, and for converting the coordinate values to a visual field coordinate system based on the view point established in the aforementioned second step, and a fourth step for adding predetermined texture to the shape data of the visual field coordinate system converted in the aforementioned third step.

The present invention is also a medium on which has been recorded a program for executing the aforementioned first through fourth steps on a computer.

The medium includes, for example, floppy discs, hard discs, magnetic tape, photomagnetic discs, CD-ROM, DVD, ROM cartridges, RAM memory cartridges with battery back-up, flash memory cartridges, nonvolatile RAM cartridges, and the like.

Wire communications media such as telephone circuits and radio communications media such as microwave circuits are also included. The Internet is also included in the communications media referred to here.

A medium refers to the recording of information (primarily digital data and programs) by any physical means, which allows prescribed functions to be executed by a processing device such as a dedicated processor. Essentially, it may be anything by which a program is downloaded to computer by any means so as to execute certain functions.

The present invention also comprises shape memory in which object shape data are prerecorded, a processing component for establishing coordinate values for objects in three-dimensional virtual space based on the shape data stored in the aforementioned shape memory, conversion means for receiving the coordinate values established by the aforementioned processing component, and for converting the coordinate values to a visual field coordinate system based on a prescribed view point, audio generating means for generating sounds based on the position of the aforementioned objects in three-dimensional virtual space, view point establishment means for establishing the position of the aforementioned view point on the basis of the sound generating state of the aforementioned audio generating means, and imaging means for adding predetermined texture to the shape data of the visual field coordinate system converted by the aforementioned conversion means.

Game development changes with the use of sounds. For example, characters call out to each other, the actions of another character end in screams of death, enemies (dinosaurs) approach to the cacophony of cars.

The present invention is also such that the aforementioned view point establishment means directs the line of vision from the aforementioned view point in the direction in which sounds are generated.

The present invention additionally comprises a first step for establishing the coordinate values of objects in three-dimensional virtual space on the basis of prerecorded object shape data, a second step for generating sounds on the basis of the position of the aforementioned objects in three-dimensional virtual space, a third step for establishing the position of the aforementioned view point on the basis of the sound generating state in the aforementioned second step, a fourth step for receiving the coordinate values established in the aforementioned first step, and for converting the coordinate values to a visual field coordinate system based on the view point established in the aforementioned third step, and a fifth step for adding predetermined texture to the shape data of the visual field coordinate system converted in the aforementioned fourth step.

The present invention is also a medium on which has been recorded a program for executing the aforementioned first through fifth steps on a computer.

The present invention is a medium on which is recorded the procedure for allowing any of the aforementioned methods to be executed by a processing unit.

The present invention is a game machine for simulated games that can be played by a plurality of players, comprising input means operated by the aforementioned players, shape memory means in which object shape data are prerecorded, a processing component for establishing coordinate values for objects in three-dimensional virtual space based on the shape data stored in the aforementioned shape memory and signals from the aforementioned input means, conversion means for receiving the coordinate values established by the aforementioned processing component, and for converting the coordinate values to a visual field coordinate system based on a prescribed view point, imaging means for adding predetermined texture to the shape data of the visual field coordinate system converted by the aforementioned conversion means, display means for displaying the imaging output of the aforementioned imaging means, back-up score calculating means for dividing the screen of the aforementioned display means into a plurality of areas corresponding to the aforementioned plurality of players, for matching the plurality of divided areas with the aforementioned plurality of players, and for calculating the back-up score on the basis of the shooting results on a player's own screen and the shooting results on another player's screen, and rating means for rating players according to the aforementioned back-up score.

Until now, gun play games for simultaneous play by multiple players displayed only the score for one's own hits, but the image area on the screen can be divided into left and right areas, for example, for two players, and a new unit referred to as the back-up score can be awarded, calculated, and displayed for successful hits against enemies not in one's own damage area.

The present invention additionally comprises switch display means for displaying a switch on the aforementioned screen, and for switching the screen when the switch is struck by the aforementioned input means.

The present invention also comprises storyline generating means for displaying a prescribed mark on the aforementioned screen, and for changing the way the game storyline unfolds when the mark is struck by the aforementioned incut means.

The present invention furthermore comprises screen switching means for switching between a subjective screen as viewed from the aforementioned player and an objective screen where part of the player is displayed on the aforementioned screen.

The present invention is a medium on which is recorded a program allowing a computer to function as the processing component, conversion means, view point establishment means, imaging means, and back-up score calculating means.

The present invention comprises position calculating means for calculating in real time the coordinate positions of peripheral devices relative to the display screen, and comprises presentation conversion means for converting the game presentation displayed on the display screen on the basis of the calculated results.

The present invention is such that the aforementioned peripheral device consists of a game gun, a photoreceptor element is disposed near the muzzle of the game gun, the photoreceptor element receives light emitted from the display screen of the display unit and generates a prescribed photoreceptor signal, and the aforementioned calculation means calculates the position coordinates for the muzzle of the game gun relative to the aforementioned display screen according to the signals.

The present invention is such that the aforementioned presentation conversion means comprises image processing means for giving the prescribed presentation images to the display at the coordinate position to which the muzzle of the aforementioned game gun is pointed on the aforementioned display screen.

The present invention comprises a recoil generating device for simulating recoil when the aforementioned game gun is fired.

The present invention is such that the aforementioned recoil generating device is air driven.

The present invention is such that the aforementioned recoil generating device comprises a cylinder, an inertia member which moves inside the cylinder, an air inlet which is connected to the cylinder and through which the aforementioned inertia member is moved to generate recoil when air is compressed, and an elastic member for returning the aforementioned inertia member to the position in which it was before it was moved.

The present invention is a recording medium on which is recorded a program for actuating the position calculating means and presentation conversion means.

The present invention is a stereo sound effects game machine, characterized by comprising a booth for housing a player, a television monitor situated in front of the player located in a specific location in the aforementioned booth, a plurality of speakers located around the player in the aforementioned specific location, sneaker driving means for forming independent sound sources corresponding to each of the aforementioned plurality of speakers, and for creating stereo sound effects, image control means for projecting images on the aforementioned television monitor, and central control means for outputting designated signals to the aforementioned speaker driving means and the aforementioned image control means as the game unfolds, and for matching sounds and images to allow the game to advance.

Stereo sound effects corresponding to game situations which change in real time can be experienced because the central control means creates sound effects by outputting designated signals as the game unfolds to the speaker driving means and image control means, and by matching the sounds and images to independently drive the speakers surrounding the player.

The plurality of speakers situated around the player are driven and controlled on the basis of independently formed sound sources, thereby allowing the location of the sounds around the player to be freely varied to reproduce extremely realistic stereo sound, while also allowing more effective stereo sound effects to be created by being linked with the images on the television monitor.

Since no headphones are used, the troubles associated with wearing headphones are eliminated. The players in the booth are isolated from the external world, and are also visually and acoustically separated from external factors, allowing the stereo sound effects to be even further enhanced.

The present invention is such that the aforementioned plurality of speakers comprise a pair of left and right front speakers situated apart from each other in prescribed locations to the left and right, respectively, in front of the player in the aforementioned specific location, and a pair of left and right rear speakers situated apart from each other in prescribed locations to the left and right, respectively, behind the player in the aforementioned specific location.

Stereo sound effects can be created by controlling the left and right front and rear speakers in front of and behind the player based on independent sound sources.

The present invention is such that the aforementioned plurality of speakers comprise a pair of left and right front speakers situated apart from each other in prescribed locations to the left and right, respectively, in front of the player in the aforementioned specific location, a pair of left and right rear speakers situated apart from each other in prescribed locations to the left and right, respectively, behind the player in the aforementioned specific location, and a low sound playback center speaker situated in a low position in the center between the aforementioned pair of left and right front speakers.

In addition to the aforementioned left and right front and rear speakers in front of and behind the player, a low sound playback center speaker is situated in the middle of the left and right front speakers, and the speakers are independently controlled, so as to create more effective stereo sound effects.

The present invention is characterized in that the aforementioned pair of left and right front speakers is situated roughly at the shoulder height of the player in the specific location, and the aforementioned pair of left and right rear speakers is located somewhat higher than the head of the player in the specific location.

The speakers are situated in the aforementioned prescribed positions relative to the player to allow the player to experience a broad range of realistic stereo sound effects in the limited interior space of the booth.

The present invention comprises operating means operated by the player, wherein the aforementioned central control means inputs operating signals from the aforementioned operating means to allow the game to advance.

When the player operates the operating means, the central control means changes the game situation, and designated symbols corresponding to the game situation are output to the speaker driving means and image control means.

Stereo sound effects corresponding to game situations which change in real time as a result of player operation can be experienced because, when the player operates the operating means, the central control means changes the game situation and creates sound effects by outputting designated signals corresponding to the game situation to the speaker driving means and image control means, and by matching the sounds and images to independently drive the speakers surrounding the player.

The present invention is such that the aforementioned operating means is a toy gun that emits infrared rays, detection means for sensing the direction in which the infrared rays are emitted by the toy gun are provided, and the detection signals of the detection means are input as the aforementioned operating signals to the aforementioned central control means.

When the player operates the toy gun, the detection means senses the direction in which the infrared rays have been emitted, and the detection signals are input to the central control means, making it possible to reproduce in image and stereo sound effects the experience of bullets flying in the direction fired by the toy gun, so that the player has a more realistic virtual experience.

The present invention is characterized in that the aforementioned detection means comprises a plurality of photoreceptors situated around the aforementioned television monitor.

The direction in which the infrared rays are emitted by the toy gun can be detected based on the way light is received by the plurality of photoreceptors situated around the television monitor.

The present invention comprises vibration means situated at the feet of the player in the aforementioned specific location and a vibration driving means for driving the aforementioned vibration means, wherein the aforementioned vibration driving means produces vibrations by driving the aforementioned vibration means by means of designated signals from the aforementioned central control means.

The central control means creates stereo sound effects by outputting designated signals as the game unfolds to the speaker driving means and image control means, and by matching the sounds and images, while at the same time outputting designated signals to the vibration driving means as the game unfolds to drive the vibration means and vibrate the feet of the player, thereby making for an even more realistic and exciting experience.

The present invention is characterized in that the aforementioned vibration means is a speaker structure, and the aforementioned vibration driving means is a speaker driving means.

The vibration means causing the feet of the player to vibrate is a speaker structure and transmits sounds, particularly low sounds, in the form of vibrations to the player, who can experience realistic vibrations resembling shaking ground.

The present invention is characterized in that the seat on which the player is seated is located in the specific location in the aforementioned booth, and the aforementioned vibration means vibrates the aforementioned seat.

The vibration means located at the feet of the player vibrates the seat on which the player is seated, allowing the player to experience vibrations with the whole body, for an even more realistic experience.

The present invention is characterized by comprising a booth for housing a player, a display component located inside the aforementioned booth, image generating means for generating images displayed on the aforementioned display component, rotation means for rotating the direction in which the aforementioned player is facing, and rotation control means for rotating the aforementioned rotation means, wherein the aforementioned rotation control means rotates the aforementioned rotation means as the game unfolds, and the aforementioned image generating means changes images according to the rotation.

The present invention comprises a booth for housing a player, a display component located inside the aforementioned booth, image generating means for generating images displayed on the aforementioned display component, and special effects generating means for giving special effects to heighten the player's sense of being in the scene as the game unfolds.

The present invention is such that the aforementioned special effects generating means discharges air at the aforementioned player.

BRIEF DESCRIPTION OF THE DRAWINGS

FIG. 14 is an example of the game screen to illustrate screen selection in the first embodiment of the present invention;

BEST MODE FOR CARRYING OUT THE INVENTION

First Aspect of the Invention

Figure 1:
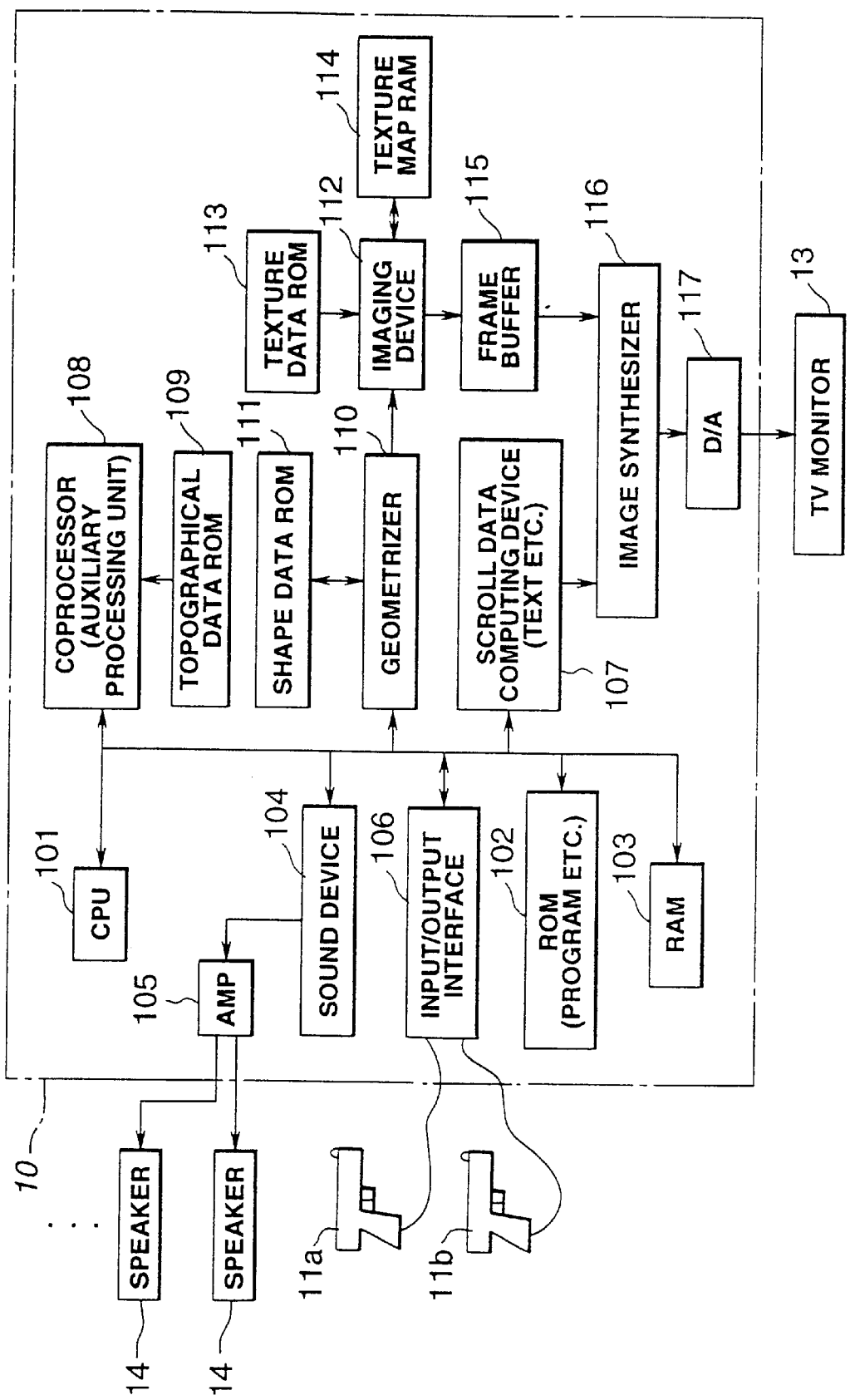
FIG. 1 is a block diagram of the functions of the device in the first embodiment of the present invention.

Embodiments of the present invention are described below with reference to the drawings. FIG. 1 is a block diagram depicting a first embodiment of the game unit in present invention. This game unit is an arcade game type of gun shooting game unit, comprising the base elements of a game unit frame 10, input device 11, TV monitor 13, and speakers 14.

Input devices 11a and 11b are shooting weapons such as pistols, machine guns, rifles, and shotguns, for shooting enemies appearing in the game (the following description is of pistols). The pistol 11 includes a photoreceptor element not shown in the figure for reading scanning spots (light spots of an electron beam) for the points of impact on the TV monitor 13, and a trigger switch not shown in the figure which is actuated by operating the gun trigger. Scanning spot detection timing and trigger timing signals are sent by means of a connecting cord to an input and output interface 106 described below. The TV monitor 13 displays the situation unfolding in the game, although a projector may be used instead of a TV monitor.

The game unit frame unit 10 has a CPU (central processing unit) 101, and is equipped with ROM 102, RAM 103, a sound device 104, input and output interface 106, scroll data processor 107, coprocessor (auxiliary processing unit) 108, topographical data ROM 109, geometrizer 110, shape data ROM 111, imaging device 112, texture ROM 113, texture map RAM 114, frame buffer 115, image synthesizer 116, and D/A convertor 117. The aforementioned ROM 102 serving as the recording medium in the present invention includes other storage means such as hard discs, cartridge type ROM, CD-ROM and various other well-known types of media, as well as communications media (the internet and various personal computer communications networks).

The CPU 101 is connected by bus lines to the ROM 102 for storing specific programs and the like, RAM 103 for storing data, sound device 104, input and output interface 106, scroll data processor 107, coprocessor 108, and geometrizer 110. The RAM 103 functions as a buffer, writing various commands (such as object display) to the geometrizer 110, writing matrices during conversion matrix computations, and the like.

The input and output interface 106 is connected to the aforementioned input device 11 (pistol). Pistol firing, the location of hits, the number of rounds fired, and the like are determined based on the scanning spot detection signals from the pistol 11, the trigger signals indicating that the pistol trigger has been pulled, the current coordinate (X,Y) positions of the scanning electron beam on the TV monitor, and the position of the target, after which the various corresponding flags are set up in the prescribed positions in RAM 103.

The sound device 104 is connected by a power amplifier 105 to a speaker 14, and the sound effect signals generated by the sound device 104 are electrically amplified and given to the speaker 14.

In the present embodiment, the CPU 101 reads the development of the game storyline on the basis of the program stored in ROM 102, topographical data from ROM 109, and shape data from the shape data ROM 11 (three-dimensional data such as "enemy characters and other such objects" and "scenery, buildings, interiors, subterranean passages and other such game backgrounds") to simulate three-dimensional virtual space, to process shooting in response to trigger signals from the input device 11, and the like.

The coordinate values in three-dimensional space for the various objects in virtual game space are established, and a conversion matrix for converting the coordinate values to a visual field coordinate system and shape data (buildings, terrain, interiors, laboratories, furniture, and the like) are designated by the geometrizer 110. Tie topographical data ROM 109 is connected to the coprocessor 108, and predetermined topographical data such as the path along which the camera moves are accordingly transferred to the coprocessor 108 (and CPU 101). The coprocessor 108 determines direct hits, controls and computes deviation between the camera line of vision and object as well as the movement of the line of sight, and the like, and thus primarily computes fluctuating decimal points. The coprocessor 108 thus determines hits on objects and computes the position to which the line of vision is moved relative to the layout of objects, and the results are given to the CPU 101. The well-known technique in Japanese Laid-Open Patent Application 8-36651, for example, can be used as the algorithm for determining hits.

The geometrizer 110 is connected to the shape data ROM 111 and imaging device 112. Polygon shape data (three-dimensional data consisting of each apex, such as buildings, walls, corridors, interiors, terrain, background, protagonist, allies, and various types of enemies) are stored in the shape data ROM 111, and the shape data are transferred to the geometrizer 110. The geometrizer 110 sees through and converts shape data designated by a conversion matrix sent from the CPU 101, and the converted data are provided to a visual field coordinate system based on a coordinate system in three-dimensional virtual space.

The imaging device 112 applies texture to the shape data of the converted visual field coordinate system for output to the frame buffer 115. In order to apply the texture, the imaging device 112 is connected to the texture data ROM 113 and texture map RAM 114, as well as to the frame buffer 115. The polygon data are referred to as data groups of relative or absolute coordinates of each apex of polygons (polygons: primarily triangles or quadrangles) consisting of collections of a plurality of apices. The aforementioned topographical data ROM 109 houses relatively crudely established polygon data by which the camera moves through virtual space according to the game storyline. By contrast, the shape data ROM 111 houses more precisely established polygon data for the shapes constituting the screen for enemies, background, and the like.

The scroll data processor 107 computes scrolling data such as text, and this processor 107 and the aforementioned frame buffer 115 are connected by the image synthesizer 116 and D/A convertor 117 to the TV monitor 13. By this means, temporarily stored objects (enemies), terrain (background), and other such polygon displays (simulation effects) as well as the scrolling display of other text data (such as a player's life count and damage points) are synthesized according to the designated priority to generate the final frame image data. The image data are converted by the D/A convertor 117 to analog signals, which are sent to the TV monitor 13, and the shooting game images are displaced in real time.

The operations are described below.

Outline

The unit in the first embodiment of the present invention is used in a shooting game. For example, the player travels in a vehicle with a pistol as a weapon on the way to an appointed destination to rescue two missing parties while shooting enemies (such as dinosaurs) blocking the way. The game is played by one or two players who shoot at enemy individuals or groups. Combat between players and enemies is one-to-one or one against many.

When the player is traveling, an objective screen (screen displaying the surrounding environment including the player) is used. This is to show the surrounding environment to the player.

Figure 2:
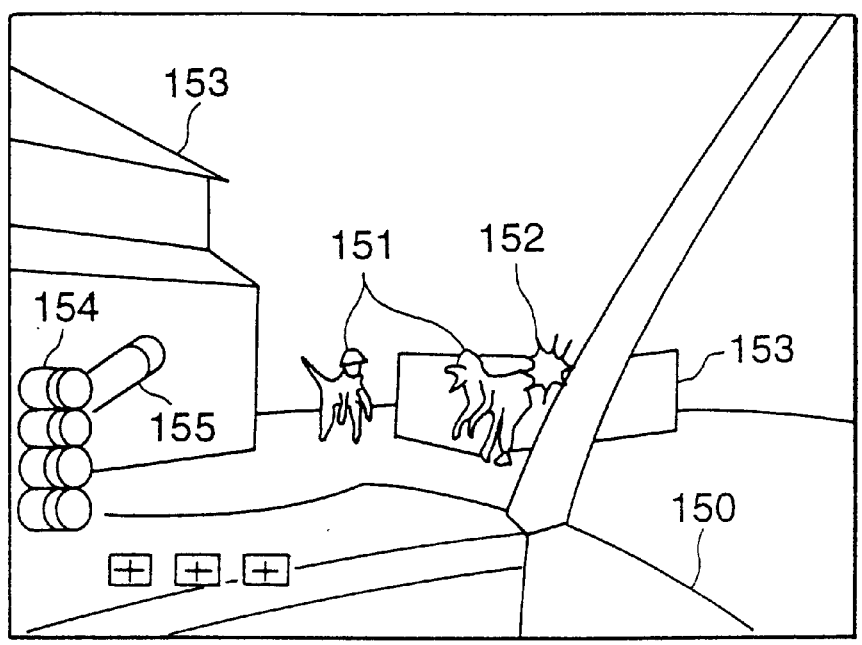
FIG. 2 is an example of the game screen in the first embodiment.

When an enemy appears, the screen is switched to subjective mode (screen seen from player's point of view), and the player engages the enemy. FIG. 2 shows an example of the screen at this time. The player looks through the windshield out of the vehicle 150 (the front part of the vehicle is displayed on the screen) at the outside scene. The enemy (in this case, a dinosaur) jumps out of the shadows of a building 153, and the player shoots at it with the gun 11. Impact 152 is displayed in the location at which the gun is aimed when fired, and the discharge of a cartridge 155 is displayed. The plurality of cartridges 154 shows the number of bullets that can be fired.

When given conditions have been met (such as when all the enemies at that point have been killed or when sophisticated playing is achieved and the enemies escape), the player travels to the next point.

The game is over when a given number of stages has been met (arrival at the destination).

Figure 3:
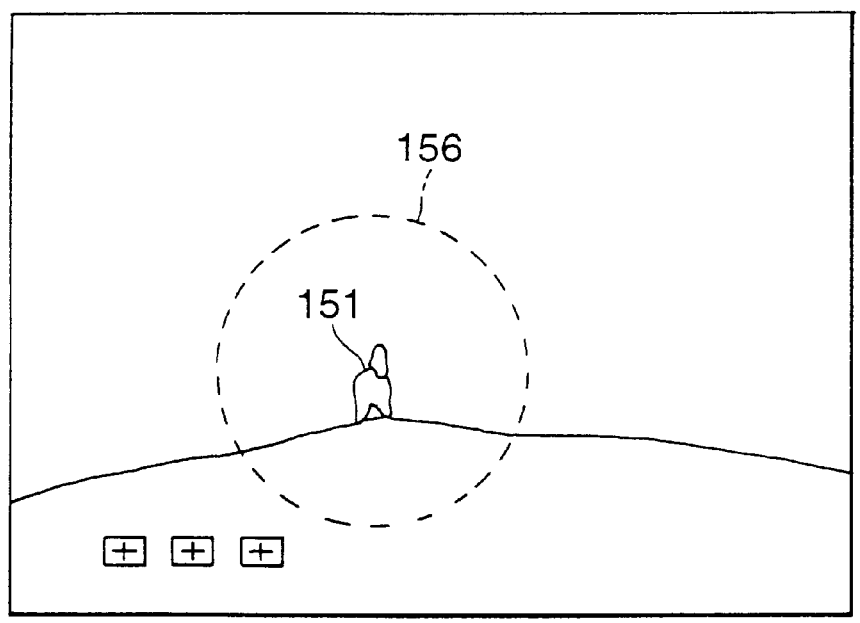
FIG. 3 is an example of the game screen (gun sight display) in the first embodiment of the present invention.

A gun sight (marker indicating the point at which the player should fire) is displayed on the enemy in the game screen, which may mean the following.
(1) Sight for Change in Storyline With this sight, the storyline changes to the player's disadvantage (such as travel along a route in which many enemies appear) when no direct hits have been made in a specific period of time. This sight has a gage indicating the elapse of a specific period of time. FIG. 3 depicts an example of the screen at this time. A circular site 156 appears around the enemy 151.
(2) Sight for Appearance of Giant Dinosaur This sight is displayed in a number of sites where a giant enemy dinosaur is found. The dinosaur is not killed except by a direct hit in all of the sights. This screen is described below.

Calculation of Back-up Score

When the game is played by two players, the back-up score between partners is calculated by the following specific process.

Figure 4:
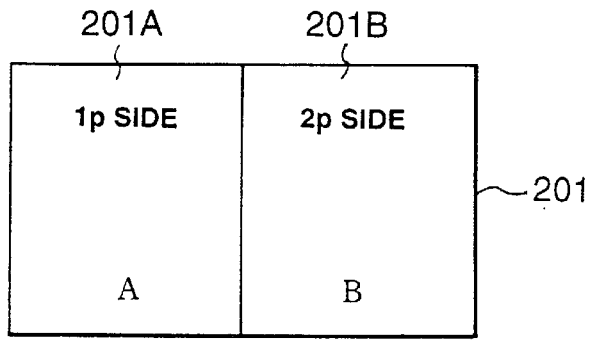
FIG. 4 is an illustration of the calculation of the back-up score in the first embodiment of the present invention.

As shown in FIG. 4, the screen 201 is divided into two equal portions to the left and right, and each player has an area sustaining damage from the enemy. The two divided screens are 201A and 201B, respectively. Player A is in charge of territory 201A, and earns points by killing enemies appearing (displayed) in this territory 201A. Player A also sustains damage from the enemies appearing in this territory 201A. Player B is in charge of territory 201B in the same manner as in the case of territory 201A. Naturally, points are awarded according to the number of enemies killed and not according to territory.

Figure 5:
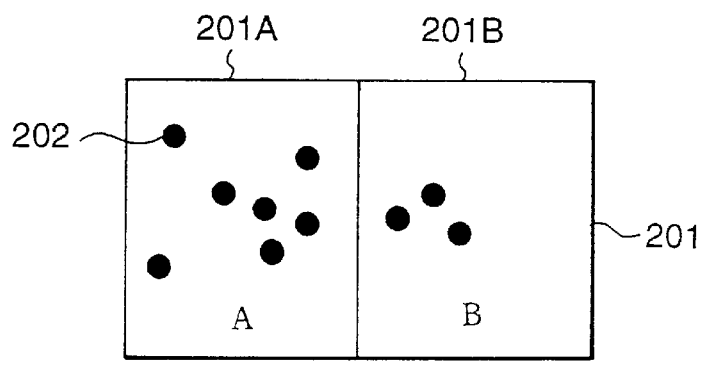
FIG. 5 is an illustration of the calculation of the back-up score in the first embodiment of the present invention.

FIG. 5 shows the number and location of enemies killed (symbol 202) by player A in a given period of time. Player A has killed seven enemies 202 in territory 201A under his charge and three enemies in the other territory 201B. That is, by killing three enemies in territory 201B, player A has backed up player B.

Figure 6:
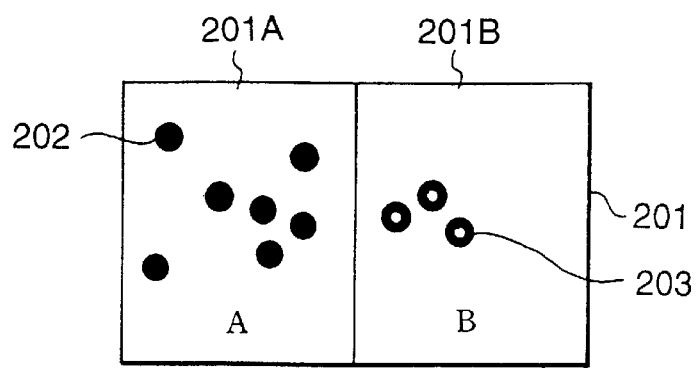
FIG. 6 is an illustration of the calculation of the back-up score in the first embodiment of the present invention.

Thus, as shown in FIG. 6, the enemies killed are divided according to territories 201A and B, and the back-up score is defined as follows, where X=7 is the number of enemies 202 killed in territory 201A, and Y=3 is the number of enemies 203 killed in territory 201B.

Back-up score =

(number of enemies killed by player in companion's territory)/

(number of enemies killed in player's own territory) =

$$Y/(X+Y) = 3/10 = 30\%$$

In this game, the back-up score is used as part of the score.

Figure 7:
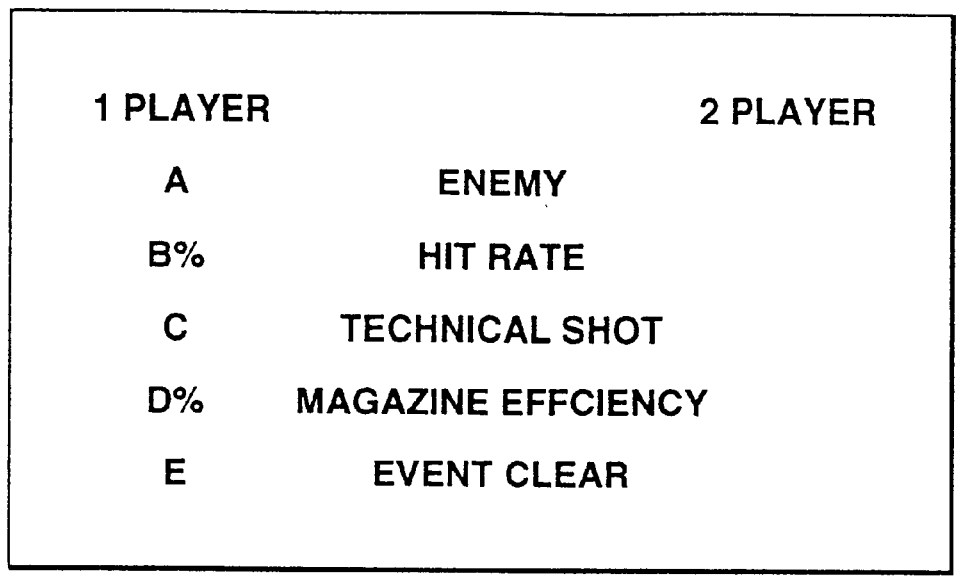
FIG. 7 is an example of the game screen n the first embodiment of the present invention.

It is used, for example, to predict player compatibility on the final screen of the game. As shown in FIG. 7, the results such as the number of enemies killed by each player and hit ratio are displayed on the final screen, and the results of the compatibility diagnosis are also displayed. When the back-up score for two people is low on both sides (less than 50%), a message such as one saying "might be time to think about splitting up" is displayed, whereas when the back-up score for two people is high on both sides (about 70%), a message such as one saying "what a well-matched pair" is displayed. When the back-up score is more than 50%, a message such as one saying "dependable" is displayed when $20>\beta>0$, and a message such as one saying "good combo!" is displayed when $100>\beta>20$, where $\beta$ is the absolute value of the difference between back-up scores. This back-up score is also used as part of the score.

Moving Line of Vision

The line of vision moves vertically and horizontally depending on the game situation. This movement changes the sense of depth. For example, the line of vision is changed in stages as the enemy approaches, thereby displaying the approach by movement. As the enemy approaches, the path also widens, so as to keep the presence of the enemy as small as possible in the screen.

Figure 8:
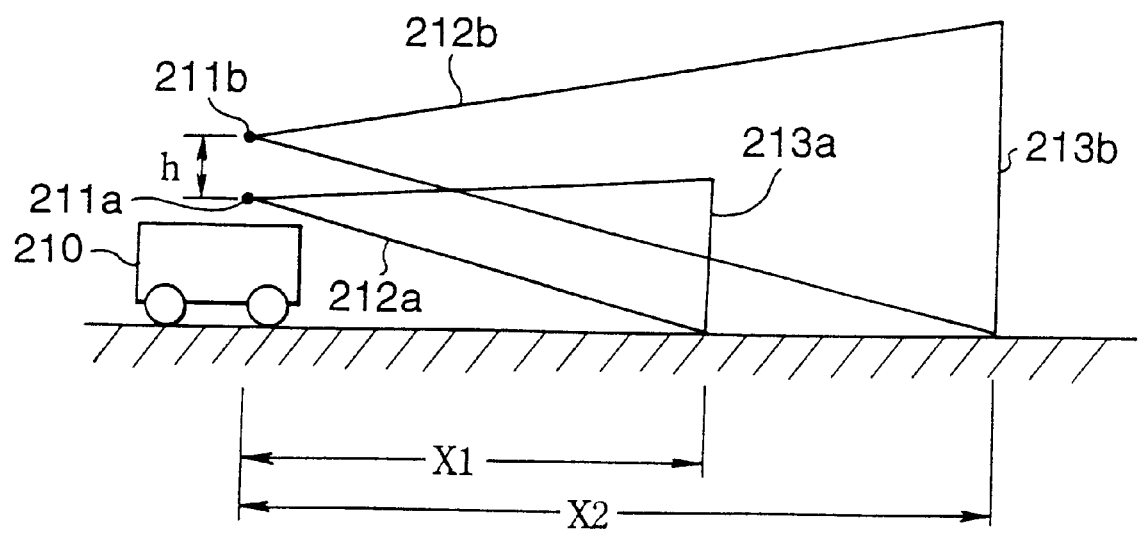
FIG. 8 illustrates the movement of the view point in the first embodiment of the present invention.

For example, as shown in FIG. 8, view points (camera positions) 211a and 211b are on the vehicle 210 on which the player is riding, and visual fields 212a and 212b are obtained, respectively, from these view points. When an enemy is in location 213a (when the distance to the enemy is x1), the view point is 211a. When the enemy is in location 213b (when the distance to the enemy is x2), meanwhile, the view point is 211b. The difference in height between view points 211a and 211b is h (view point 211b is higher than view point 211a). The height of the view point drops in proportion to the approach of the enemy, for example.

Figure 9:
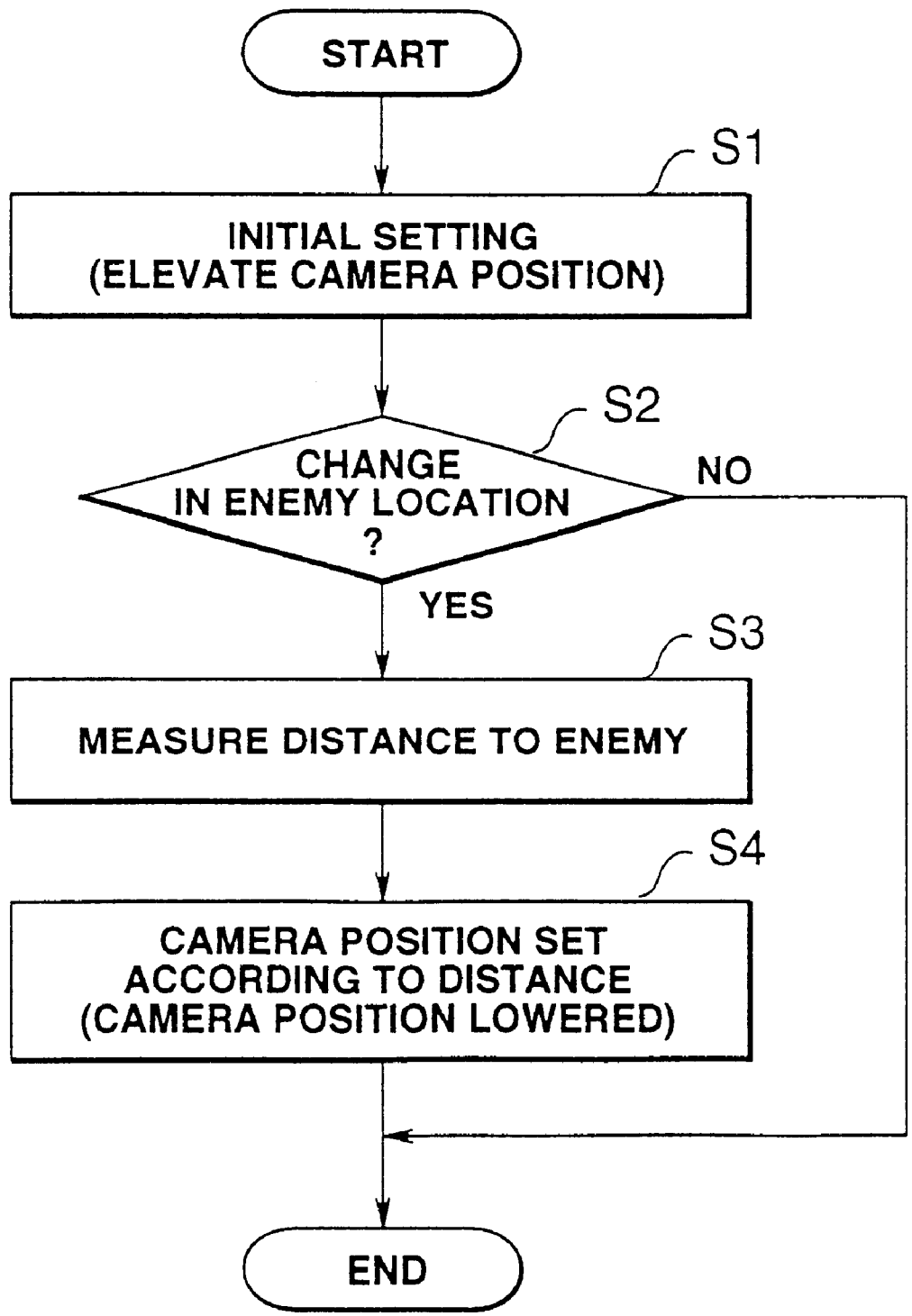
FIG. 9 is a flow chart of the processing for the movement of the view point in the first embodiment of the present invention.

FIG. 9 is a flow chart of this process. First, the view point is established at location 211b in FIG. 8, for example, for initialization (S1). It is determined whether or not the enemy location x2 has changed (S2). When it has changed, the distance x1 to the enemy is measured (S3). The camera position is then established at view point 211a in conformity with the distance x1 (S4).

Figure 10:
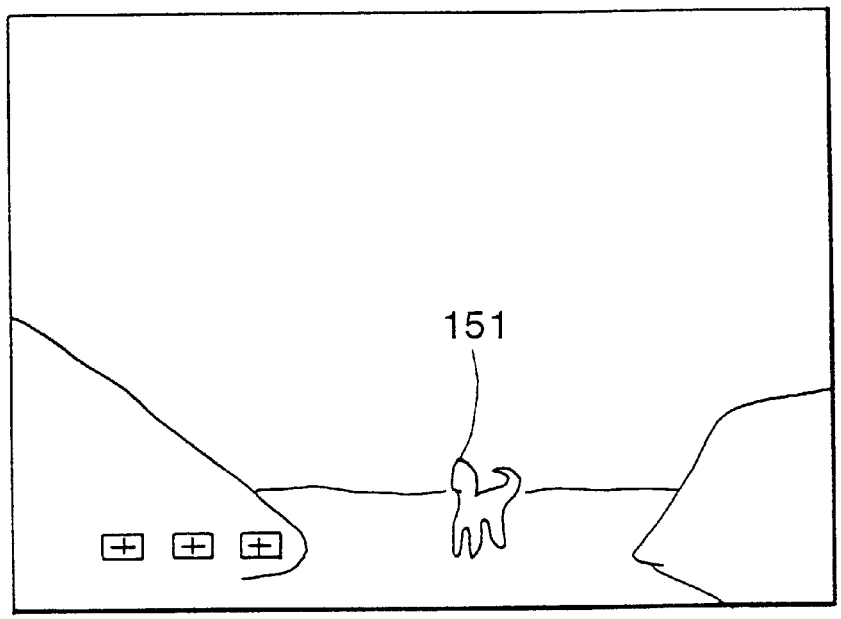
FIG. 10 is an example of a game screen to illustrate the principles of the movement of the view point in the first embodiment of the present invention.
Figure 11:
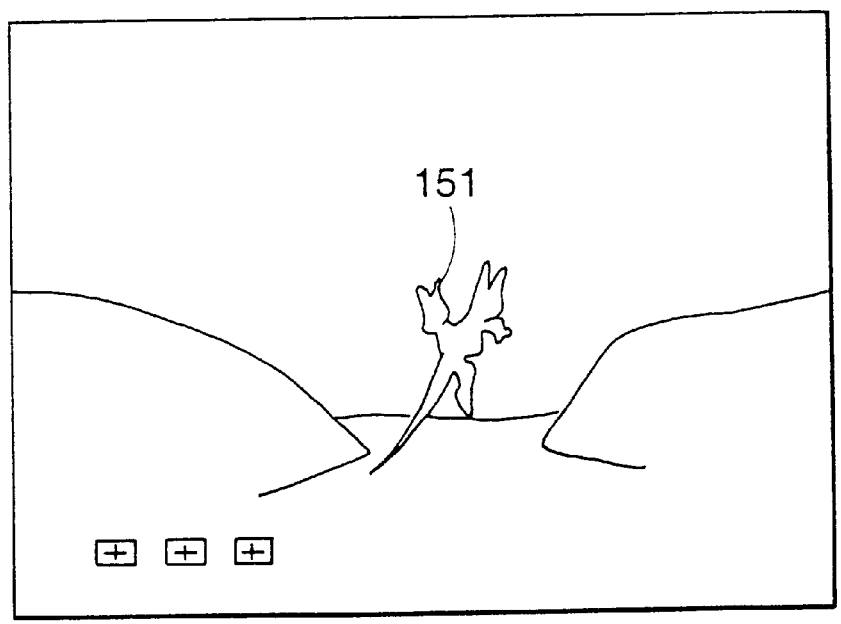
FIG. 11 is an example of the game screen to illustrate the principles of the movement of the view point in the first embodiment of the present invention.

Examples of screens are depicted in FIGS. 10 and 11. FIG. 10 is of a screen when the enemy is at a distance, and is viewed from above. This screen allows a complete command of the scene, so that all enemies can be seen when several appear. FIG. 11 is a screen of when the enemy is approaching, and allows the enemy to be apprehended from the front, making it easier to shoot. FIG. 11 depicts a bullet directly hitting the enemy 151.

The camera view point also moves so as to following the enemy that is closest to the player. When, for example, the closest enemy moves off screen, the line of sight is directed in the direction in which the enemy has moved. The closest enemy is thus always displayed in the screen. The player therefore knows which enemy is closest and should be killed, making it easier to know what to do.

When an enemy goes off screen, the line of vision automatically moves in the direction of the sound (roars and the like) made by the enemy. This allows the player to easily find new enemies.

Enemy Control (Part 1)

Figure 12:
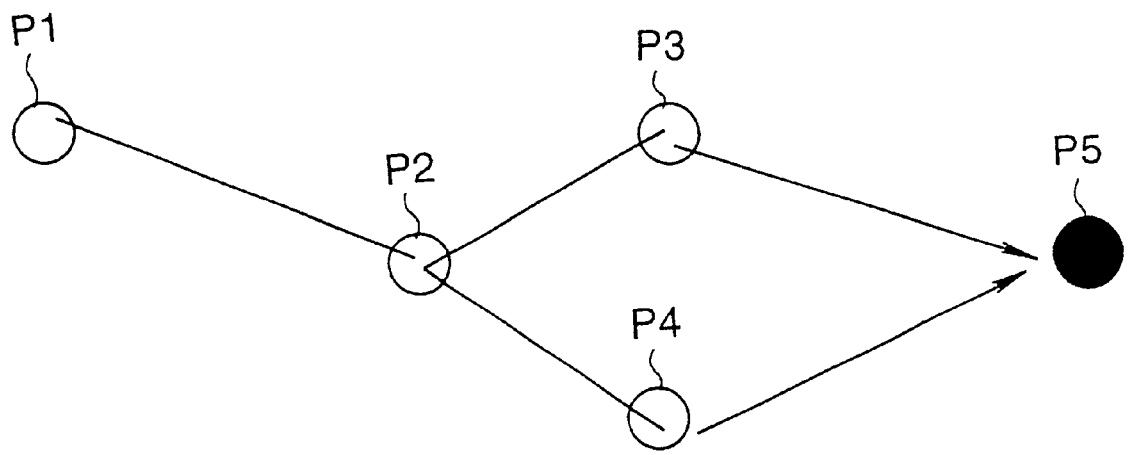
FIG. 12 is an illustration of the control of enemies in the first embodiment of the present invention.

Enemies attack both individually and in groups. Enemies move between points P1 through P5 situated as shown in FIG. 12 (based on spline function). Data are introduced at each point for the determination of branched/special motion and the like. For example, a given enemy follows the route from P1 to P2 to P3 to P5, and another enemy follows the route from P1 to P2 to P4 to P5. The points are arranged on or behind buildings, on or behind terrain, or the like. The manner in which these points are followed varies according to player level. The player can memorize these points to get through the game better.

Enemy Control (Part 2)

The behavior of an enemy is affected by other enemies. For example, when a given enemy cries out upon being attacked in a vulnerable spot, other enemies nearby stop and turn. When enemy movement thus halts, even for a moment, it is to the player's advantage.

Alternatively, when bullets directly hit glass or water, the enemy reacts to the sound of impact. For example, the enemies gather upon hearing such sounds. This allows an extremely realistic game to unfold.

The extent to which enemies are affected varies depending on the type and magnitude of the sound. For example, when the enemy leader is hit in a critical area (such as the crown of the head), all of the enemies may be affected. When glass is struck, enemies within a radius of 10 m in virtual space may be affected. Similarly, when a high-pitched metallic sound is produced, or an enemy other than the leader is struck on the crown of the head, or the sound of trees bursting is produced, enemies within a radius of 6, 3, or 2 m, respectively, may be affected.

Switching From Subjective Screen to Objective Screen

Until now, screens have been subjective, where the enemy is seen by the player. However, during multiple play, the screen is sometimes switched to an objective screen displaying a player on the screen. That is, the subjective screen is switched to an objective screen, allowing a player that is playing at the same time to help another player.

Figure 13:
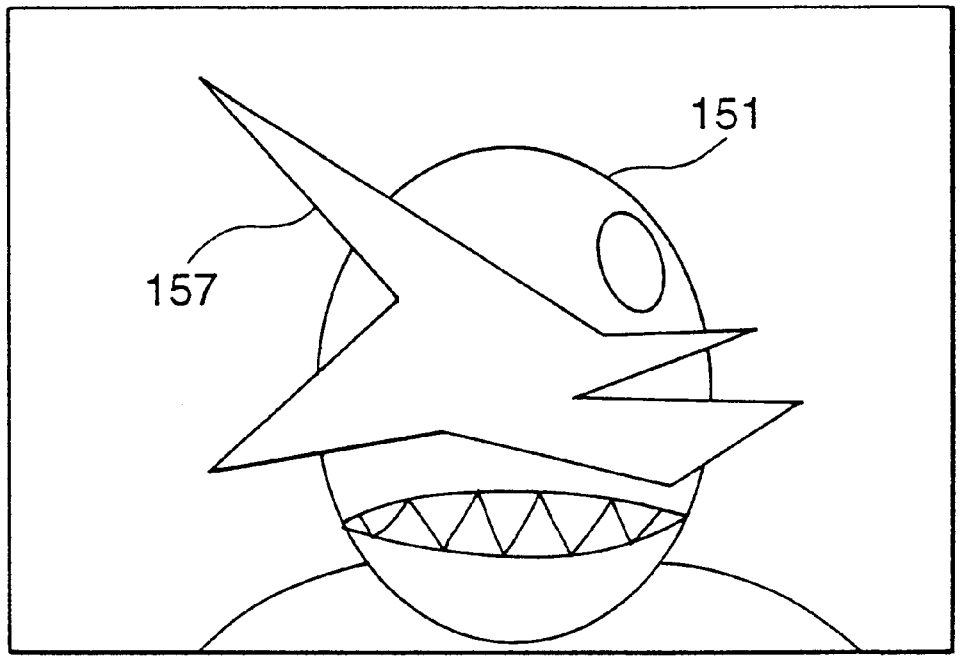
FIG. 13 is an example of the game screen to illustrate switching between objective and subjective screens in the first embodiment of the present invention.
Figure 13:
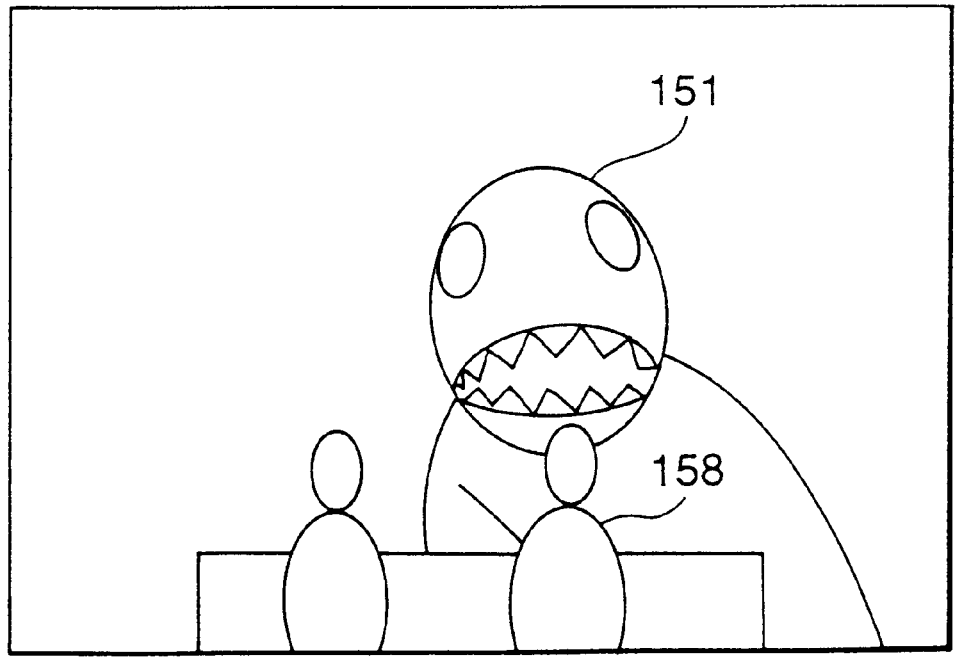

This is described with reference to FIGS. 13 and 14. FIG. 13(a) is of a screen in which the enemy 151 strikes and damages the vehicle in which the players are riding. The symbol 157 is an image indicating the impact. When the enemy 151 strikes the vehicle, one of the players is taken away. For example, FIG. 13(b) shows the player 158 on the right side of the vehicle just before being seized by the enemy. At this time, a damage point is added to the player. FIG. 13(a) is of a subjective screen, whereas FIG. 13(b) is of an objective screen.

Figure 14:
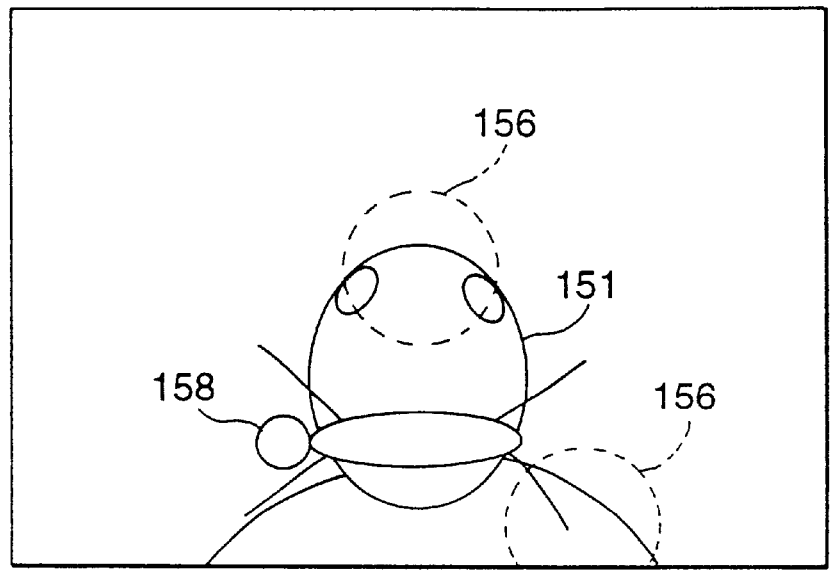
FIG. 14 is an example of the game screen to illustrate switching between objective and subjective screens in the first embodiment of the present invention.

FIG. 14 shows the player being taken by the enemy (symbol 158 is the player). At this time, another damage point will be added to the player 158 unless the other player shoots the enemy's weak point (all of sight 156 in FIG. 14) within a prescribed period of time. Caution is required at this time since more player damage points will be added if the bullets strike the player 158.

Gun Control

The ability to fire the gun 11 is demonstrated through control of the recoil and trigger. For example, when only one bullet shows up on the screen, the recoil is weak when the bullet can be fired. When no bullets are left, the trigger will not work.

Screen Selection

Figure 15:
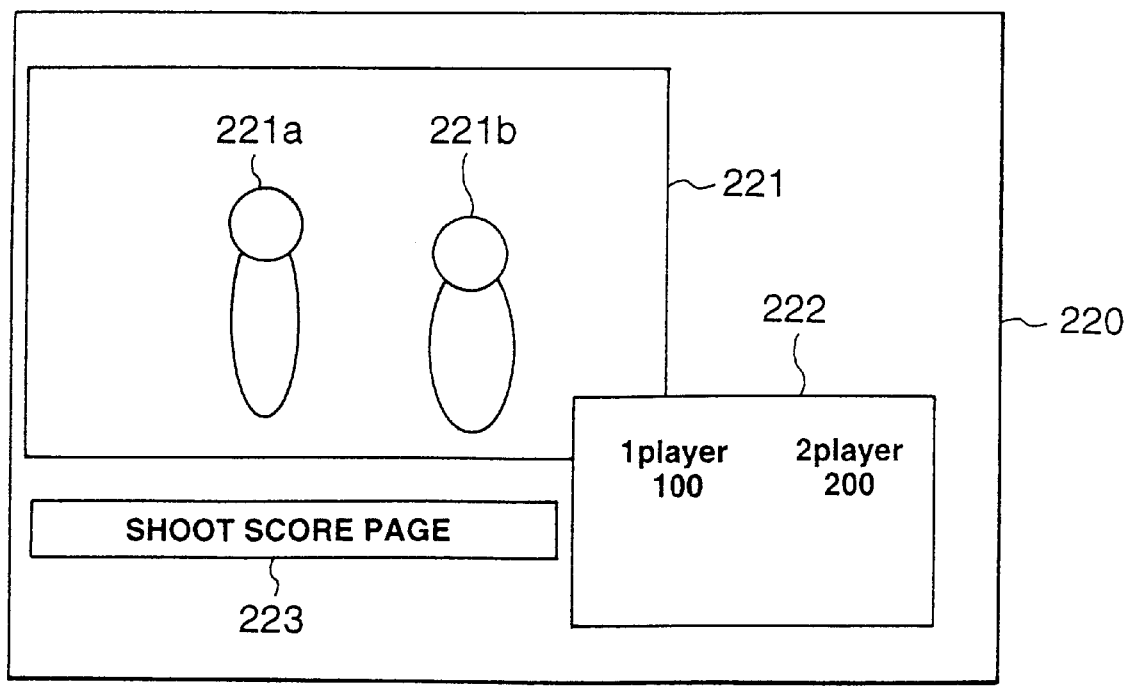
Figure 16:
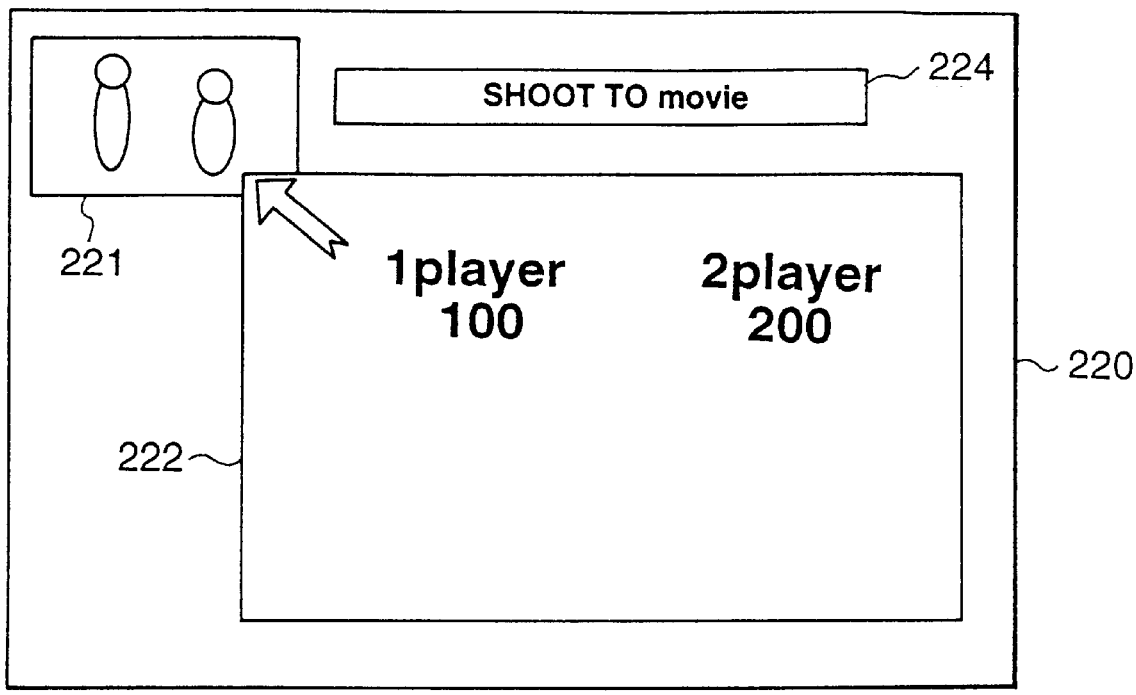
FIG. 16 is an example of the game screen to illustrate screen selection in the first embodiment of the present invention.

Either the score screen or objective screen can be selected for demonstration during the game. For example, as shown in FIG. 15, when a large objective screen 221 and a small score screen 222 are displayed in the display screen 220, the player strikes the selection screen 223 "SHOOT TO SCORE PAGE" to make the score screen 222 large and the objective screen 211 small, as shown in FIG. 16. The player can strike the selection screen 224 "SHOOT TO movie" to return to the screen depicted in FIG. 15.

Second Embodiment

In the first embodiment, the invention was described using a shooting game as an example, but it need hardly be pointed out that applications of the present invention are not limited to this type of game. An example of its application to a baseball game will be described.

Figure 17:
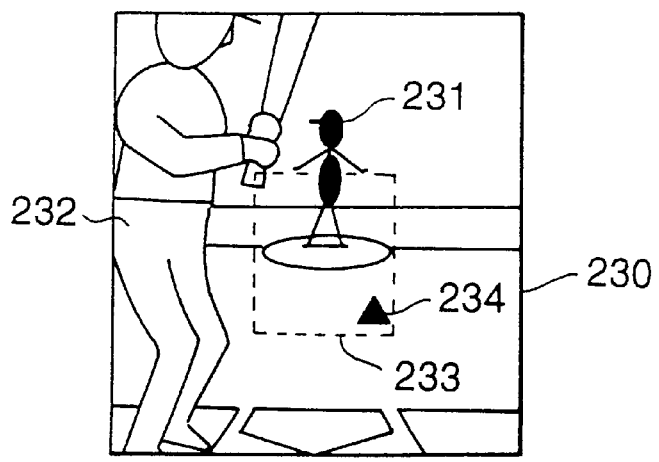
FIG. 17 is an example of the game screen to illustrate the principles of the movement of the view point in a second embodiment of the present invention.
Figure 18:
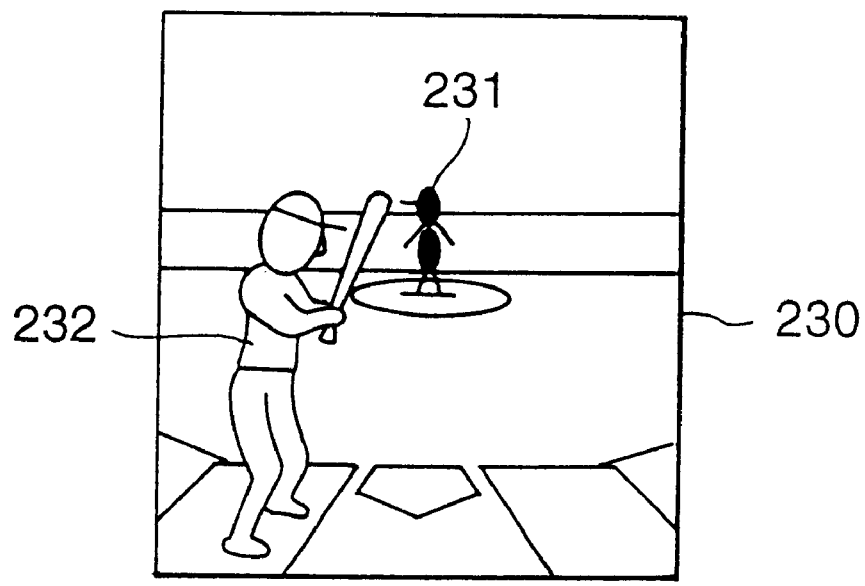
FIG. 18 is an example of the game screen to illustrate the principles of the movement of the view point in the second embodiment of the present invention.
Figure 19:
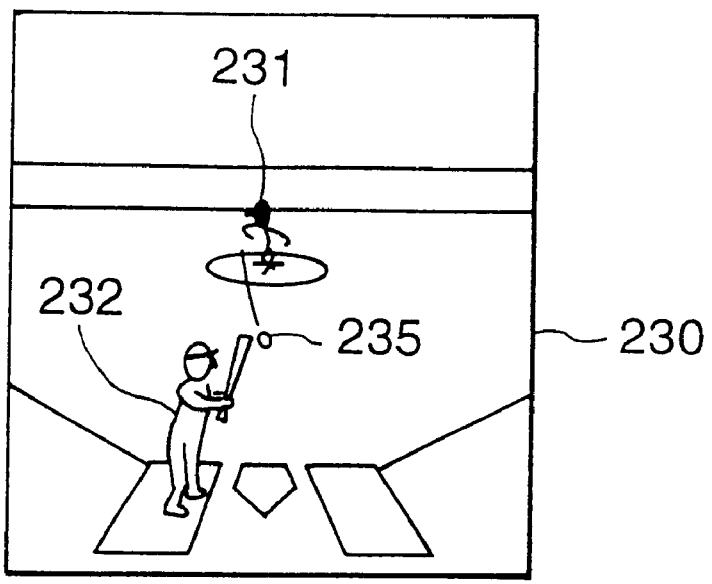
FIG. 19 is an example of the game screen to illustrate the processing for the movement of the view point in the second embodiment of the present invention.

FIGS. 17 through 19 show images in which the pitcher is seen from the catcher's point of view. In baseball games, it is possible to provide screens that are easy to see by changing the height of the view point for each scene, such as scenes in which the pitcher exchanges signs with the catcher to determine how to throw the ball, scenes in which the pitcher decides on a throw and begins the pitching motion, and scenes in which the pitcher pitches the ball.

FIG. 17 is of a scene in which the pitcher is deciding which kind of pitch to throw. FIG. 17 is from the point of view of the catcher. The strike zone 233 for the batter 232 is shown by dotted lines. A path mark 234 is set anywhere in the strike zone 233 for the pitcher 231 to decide on the pitching path.

FIG. 18 is of a scene in which the pitcher begins the pitching motion. Once the pitching path has been decided, as described above, the camera pans and refocuses to modify the position of the point of view (the path is elevated).

FIG. 19 is of a scene of the pitcher pitching. In this screen, the path is further elevated. The batter 232 bats in the image on this path.

When the batter 232 then hits the ball 235, the camera line of vision moves in the direction in which the ball travels.

Figure 20:
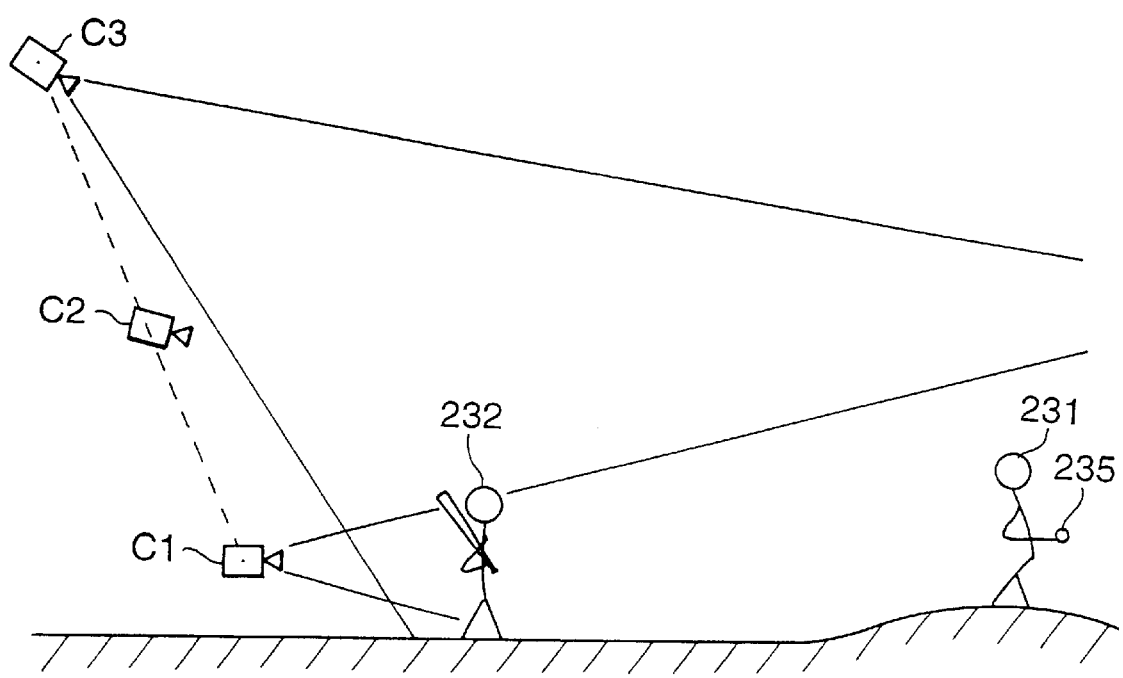
FIG. 20 is an illustration of the processing for the movement of the view point in the second embodiment of the present invention.

FIG. 20 schematically illustrates the view point positions of the screens in FIGS. 17 through 19. The camera in FIG.

17 is in position C1. Position C1 is the catcher position. The camera in FIGS. 18 and 19 is in positions C2 and C3, respectively. The camera moves continuously or in stages along the line of view in FIG. 20. The camera movement is automatically processed and imposes no burden on the player.

Figure 21:
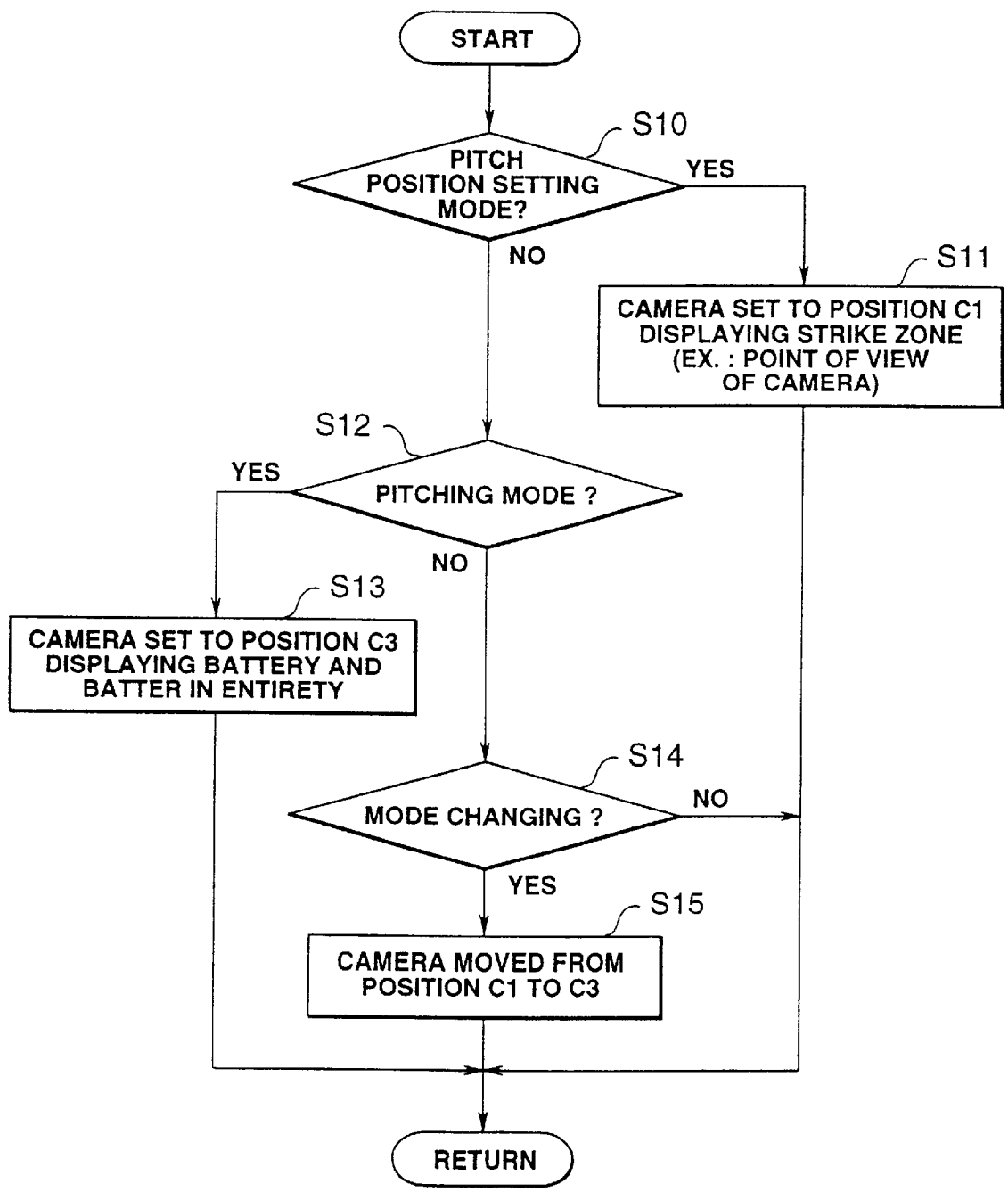
FIG. 21 is a flow chart of the processing for the movement of the view point in the second embodiment of the present invention.

FIG. 21 is a flow chart of this process. It is first determined whether or not the pitcher is in pitch position setting mode (S10). If YES, then the camera is set in position C1 where the strike zone is indicated, so that the player can easily set the pitch position (S11). If NO, it is determined whether or not the pitcher is in pitching mode (S12). If YES, the camera is set in position C3 where the battery and the batter are displayed (S13) in their entirety. If NO, it is determined whether or not the mode is in a switched state (S14). If YES, the camera moves from position C1 to position C3, as shown in, FIG. 20 (S15).

This allows the pitching path between the pitcher and catcher to be easily set in detail, and makes the bat swing timing easier during batting.

When the pitching and hitting screen in baseball games is a fixed screen looking down diagonally, the ball speed and the path of the inside and outside angles or the like were readily determined, but the type of pitch by the pitcher (particularly differences in height) could not be precisely set. In the second embodiment of the present invention, the pitching path can be readily set in detail using the screen from the point of view of the catcher in FIG. 17.

When the point of view of the screen is fixed from the catcher's point of view in a baseball game, it is difficult to get the batter timing right because it is difficult to get a sense of the distance from the pitcher to the batter. In the second embodiment of the present invention, it is easier to get the batter timing right in the screen having the point of view shown in FIG. 19. It is also easier to overlook the entire field.

The screen from the point of view given in FIG. 19 makes it easier to apprehend the ball path and batting timing in baseball games.

Described in terms of the first embodiment, it is easier to apprehend the route of the enemy's approach and the situation during the approach.

Third Embodiment

The third embodiment relates to a game machine in which the coordinates created by the muzzle of the game gun on the television monitor can be sensed in real time, and the prescribed game presentation can be altered according to the detected results.

This type of game machine is well known as what is referred to as a shooting game. An example of such a shooting game is "Virtual Cop," by Sega Enterprise. Players enjoy this game by pulling the trigger of a game gun, which is a peripheral device in the form of a gun, while aiming at the television monitor to shoot enemy characters appearing on the screen.

Enemy characters (enemies) are concluded to have been successfully shot when the muzzle is aligned with the enemy characters, and shots are concluded to have been unsuccessful when not so aligned. In cases where an enemy character has been successfully shot, the result is visualized (which may be referred to as a demonstration image, game presentation, presentation result, or the like) to indicate that the enemy character has been killed. Here, the absolute coordinate positions created by the game gun on the television screen were computed in the past as follows.

When the game gun trigger was pulled, the television screen instantaneously brightened, and a photoreceptor element at the front end of the game gun aimed at the screen received light from scanning spots in the scanning lines at that time. At this point in time, the coordinate position at which the muzzle of the game gun was aimed on the television screen was computed by a computing device in the game machine unit based on the trigger-on timing and the timing of the light received by the photoreceptor element.

In this method, however, the sighting position of the gun could be computed only when the trigger was on, so the game presentation results could display only images of shooting success or failure.

In the embodiment described below, the sighting position of the muzzle can be computed or detected in real time, that is, in shorter fixed periods of times such as every 1/60th second, which is the imaging time, for example.

Figure 22:
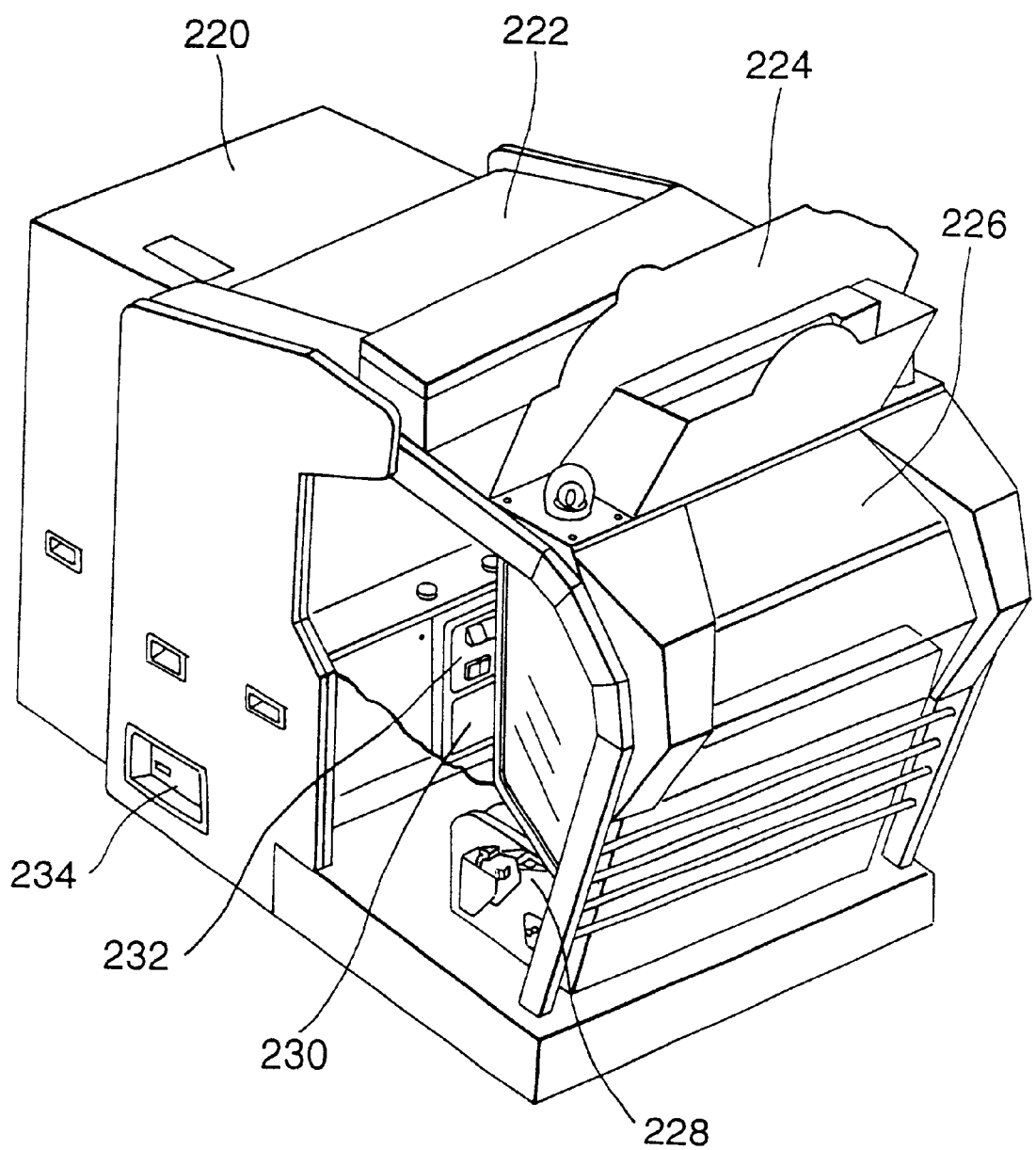
FIG. 22 is an oblique view of the entire game structure in the third embodiment of the present invention.

FIG. 22 is an oblique view of the entire game machine relating to the present embodiment. 220 is a projection television, 222 is a front cabinet, 224 is a bill board, 226 is a rear cabinet, 228 is a peripheral device (game gun or gun controller), 230 is a cash box, 232 is a coin chute door, and 234 is an AC unit.

As will be described below, the cockpit around the player is almost completely covered by the cabinets because the position formed on the screen by the muzzle of the game gun is detected with the use of infrared rays emitted from the peripheral frame of the screen.

Figure 23:
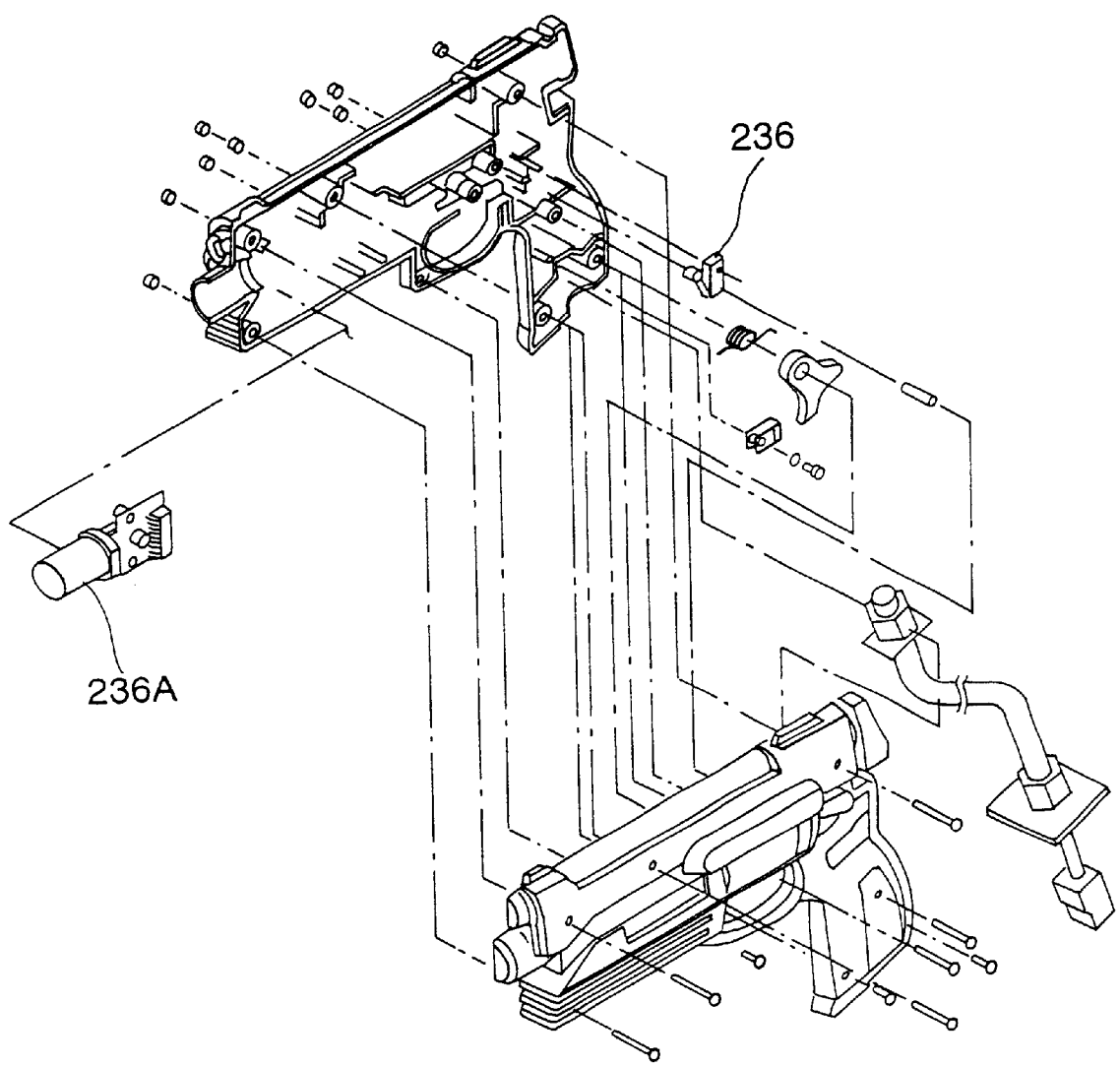
FIG. 23 is an exploded oblique view of the gun unit (game gun) in the third embodiment of the present invention.
Figure 24:
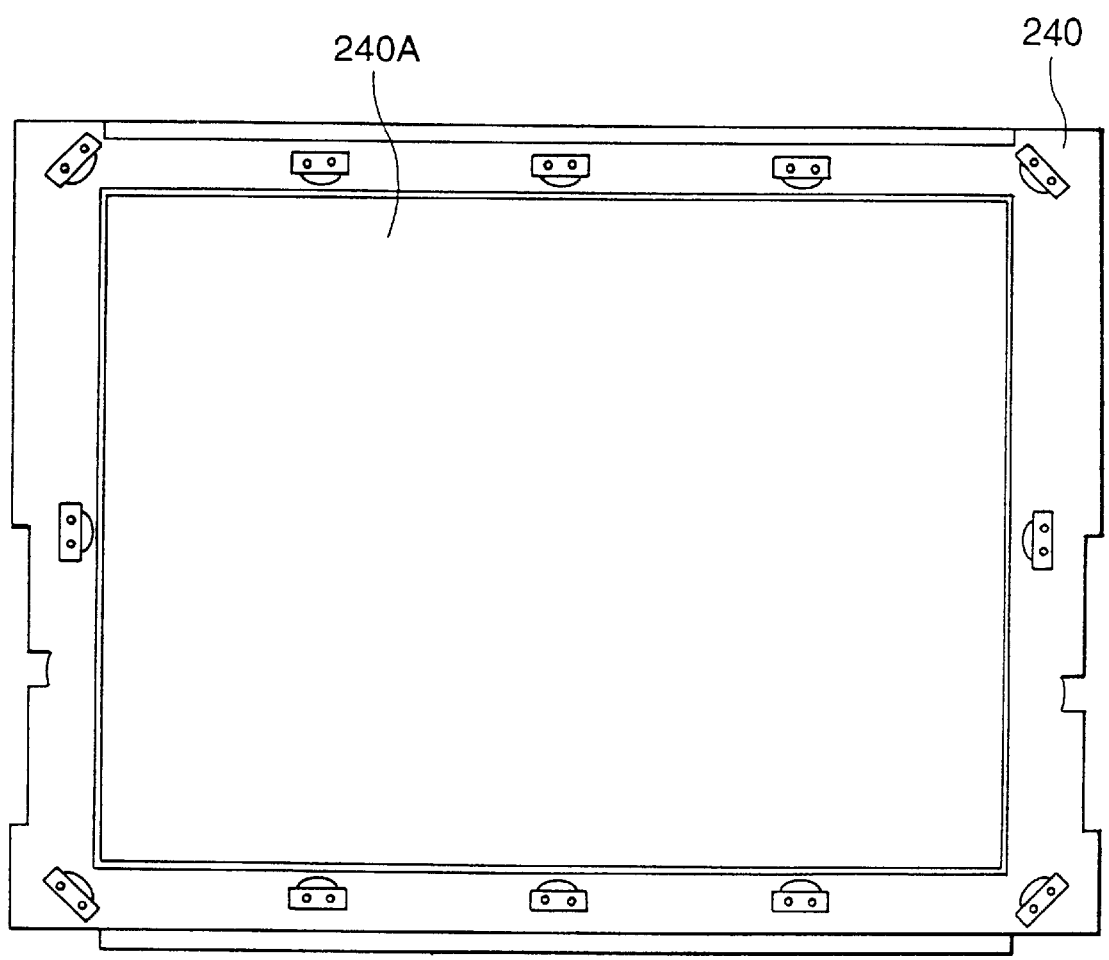
FIG. 24 is a front view of the display depicting infrared emitting elements situated around the display in the third embodiment of the present invention.

FIG. 23 is an exploded view of the game gun, in which an infrared sensor unit 236A is fixed to the muzzle component at the tip of the game gun. 236 is a microswitch for sensing when the trigger is on or off. FIG. 24 is a schematic of the display of the television 220, where 12 infrared light-emitting elements are uniformly located around the display.

Figure 25:
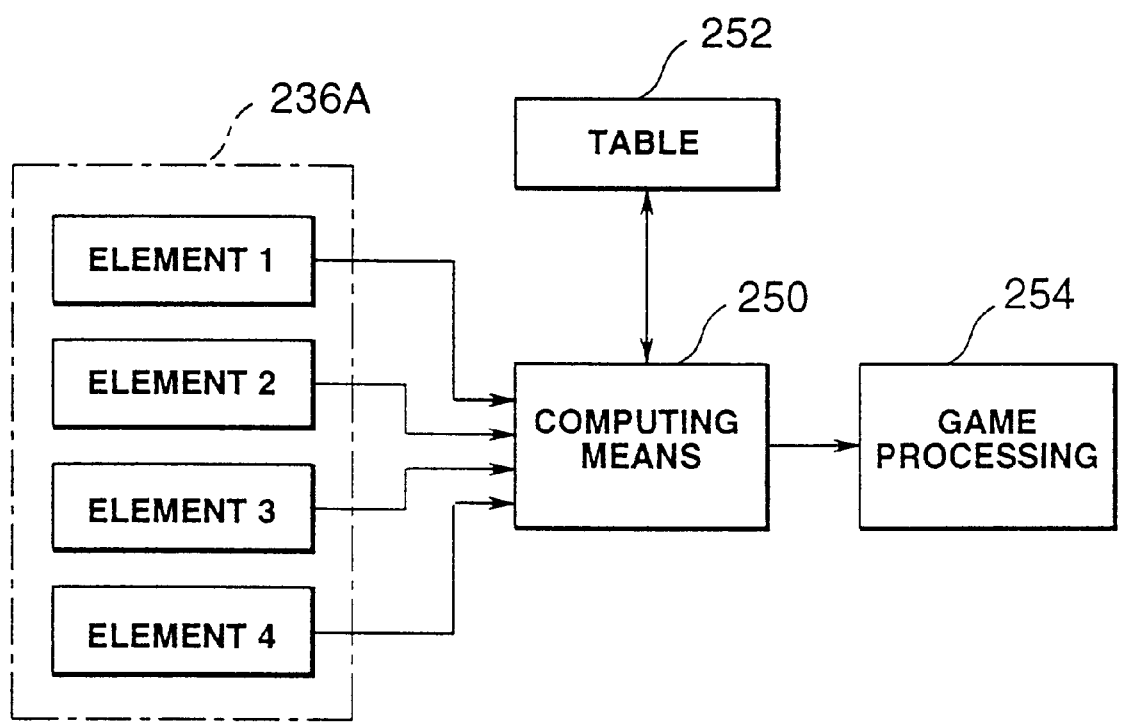
FIG. 25 is a block diagram of the system in the third embodiment of the present invention.

FIG. 25 is a system diagram of the aforementioned game gun, where the infrared sensor unit 230A is composed of four infrared photoreceptor elements. The four photoreceptor elements are located in four separate partitions. The light reception signals from each photoreceptor element are input to a computing means 250 for computing the muzzle coordinate position formed on the screen from these light reception signals. The amount of light (light reception ratio) from the four photo receptor diodes, for example, is determined relative to all 12 light-emitting elements based on the detection signals of each element and the balance and proportion or imbalance and difference or the like in the signal levels between the elements, and the gun aim and position are computed as described above with reference as needed to predetermined data in a table 252 on the relationship between the photoreceptor signals and coordinate positions. The computing means computes the coordinate positions on the screen at which the muzzle is aimed based on the above aim and position, the computed results are output to the game processor (means) 254, and an image of the prescribed presentation results is displayed as the game screen. Thus, unlike the conventional method in which the screen light was detected by a photoreceptor component in the gun, the present method does not require light to be shone on the screen (light shining on the screen when the trigger is on can be stressful to the player), and the coordinate position of the muzzle can be detected regardless of whether or not the trigger is pulled.

The computing means 250 and game processing means 254 are actuated by the CPU 101 which is operated by prescribed programs stored in ROM 102, 108, 111, or 113, and a table is preset in ROM 102.

Figure 26:
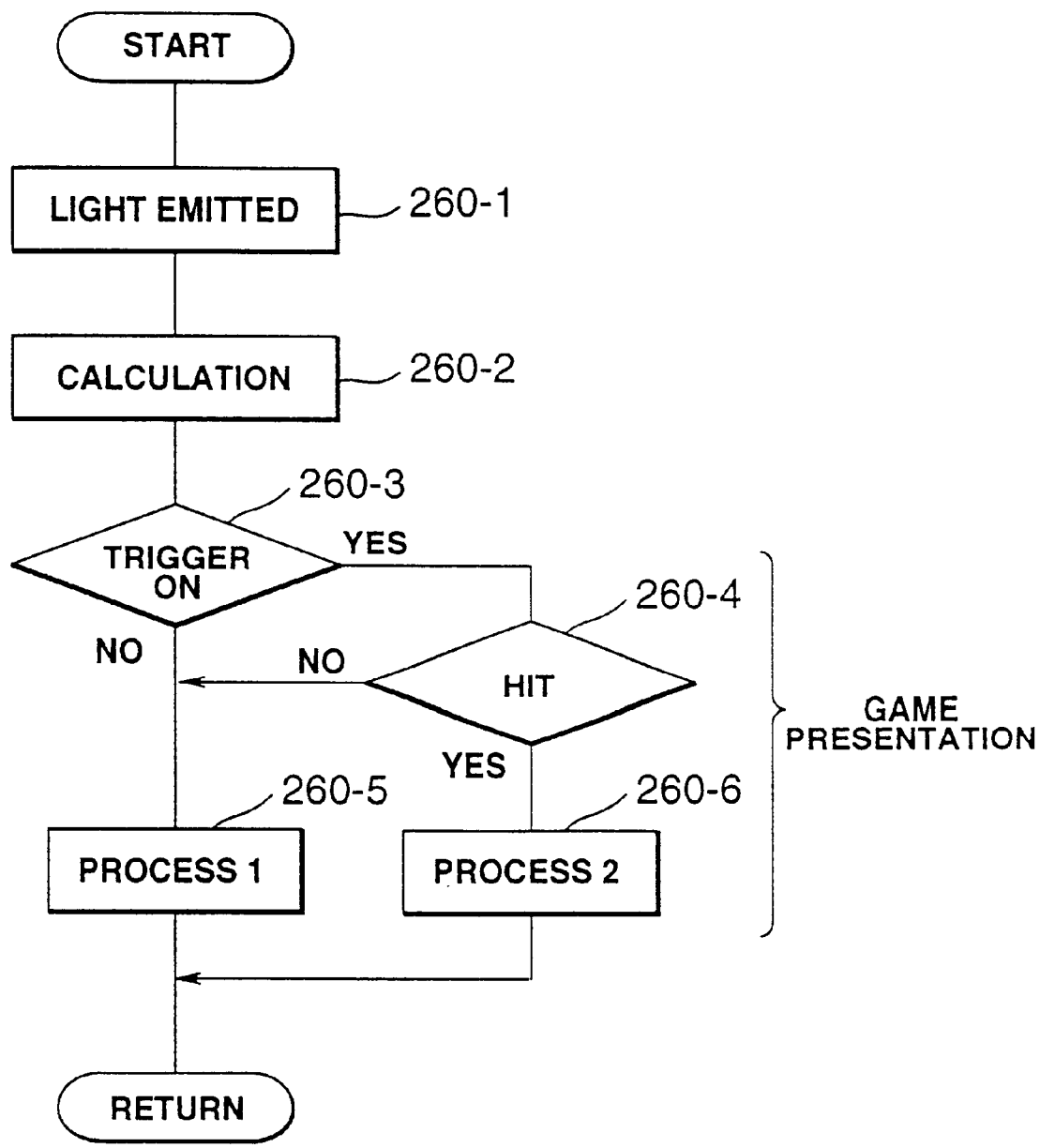
FIG. 26 is an operational flow chart.

FIG. 26 is a flow chart of the operations in FIG. 25. First, in step 260-1, infrared rays are received by the sensor unit 230A. Here, the 12 infrared light-emitting elements 240 sequentially emit light. No two or more emit light at the same point in time. Differences in the proportion of light received by the four photoreceptor elements are thus produced as a result of differences in the direction or angle of the photoreceptor element (muzzle) aimed at the screen.

The coordinate position (x,y) formed by the muzzle on the display screen is then detected in step 260-2.

In step 260-3, it is determined whether or not the game gun trigger is on, and when it is on, it is determined in step 160-4 whether or not the muzzle position (x,y) is within the character area, that is, it is determined whether or not the shot is a direct hit. When it is determined that a direct hit has been successfully made, an image showing a direct hit by a bullet, such as a presentation of a dinosaur being killed, is displayed on the television screen in step 260-6 (process 2).

When the trigger is not on in the aforementioned step 260-3, an image of the results based on the following process 1 is displayed in step 260-5. An example of process 1 is one in which the gun is aimed at an image where some action other than shooting the gun can be taken on an object by just aiming the gun at the object, such as an image of a pitch-black scene which can be illuminated by a search light (a circle or the like that is centered on the muzzle coordinates and extends a prescribed interval around the coordinates), assuming the main character has a search light, since the muzzle coordinates can be computed and detected in real time (perpetually). If the trigger is on when an enemy character is present in this region, the enemy character is hit by a bullet. Even when the trigger is not on, the enemy character is surprised by being in an area lit up by the search light and quickly flees or roars, or an item can be lit up when the muzzle is aimed at such an item which cannot be seen in the bushes or the like, or another such presentation effect can be created.

Since it is also possible to sense when coordinates at which the muzzle is aimed are beyond the screen, the prescribed game presentation can be given even when the trigger is not on while the muzzle is aimed beyond the screen. Reloading (replacing the ammunition) is an example. In the past, the trigger had to be on, with the muzzle aimed beyond the screen.

As described above, the invention in this embodiment makes it possible for photoreceptor elements to detect in real time infrared rays constantly emitted from light-emitting elements, allowing the coordinates of the game gun (peripheral device) on the game machine screen to be computed and detected in real time. A plurality of light-emitting elements are provided, and the coordinates of the peripheral device are readily detected on the basis of the light reception ratio using a plurality of photoreceptor elements, which can be effectively reflected in game presentations. The invention is not limited to infrared light-emitting and photoreception systems, provided that the muzzle coordinates can be detected.

The present invention can thus detect such coordinates at any time and can produce a diverse array of presentation effects, as opposed to those which cannot detect coordinates unless the peripheral device is being operated (the trigger is on) and in which presentation effects are limited to whether or not the gun has been fired. The muzzle sight can also be displayed on screen constantly, or n real time.

It goes without saying that the present invention can also be applied to games, in addition to the aforementioned shooting game or baseball game, that provide screens which are easy for the player to manipulate by changing the point of view as desired, screens that afford a sense of being actually present in the scene, and screens that have a variety of changes and are interesting, as well as other image processing devices that display images in three-dimensional virtual space.

Fourth Embodiment of the Present Invention

Figure 27:
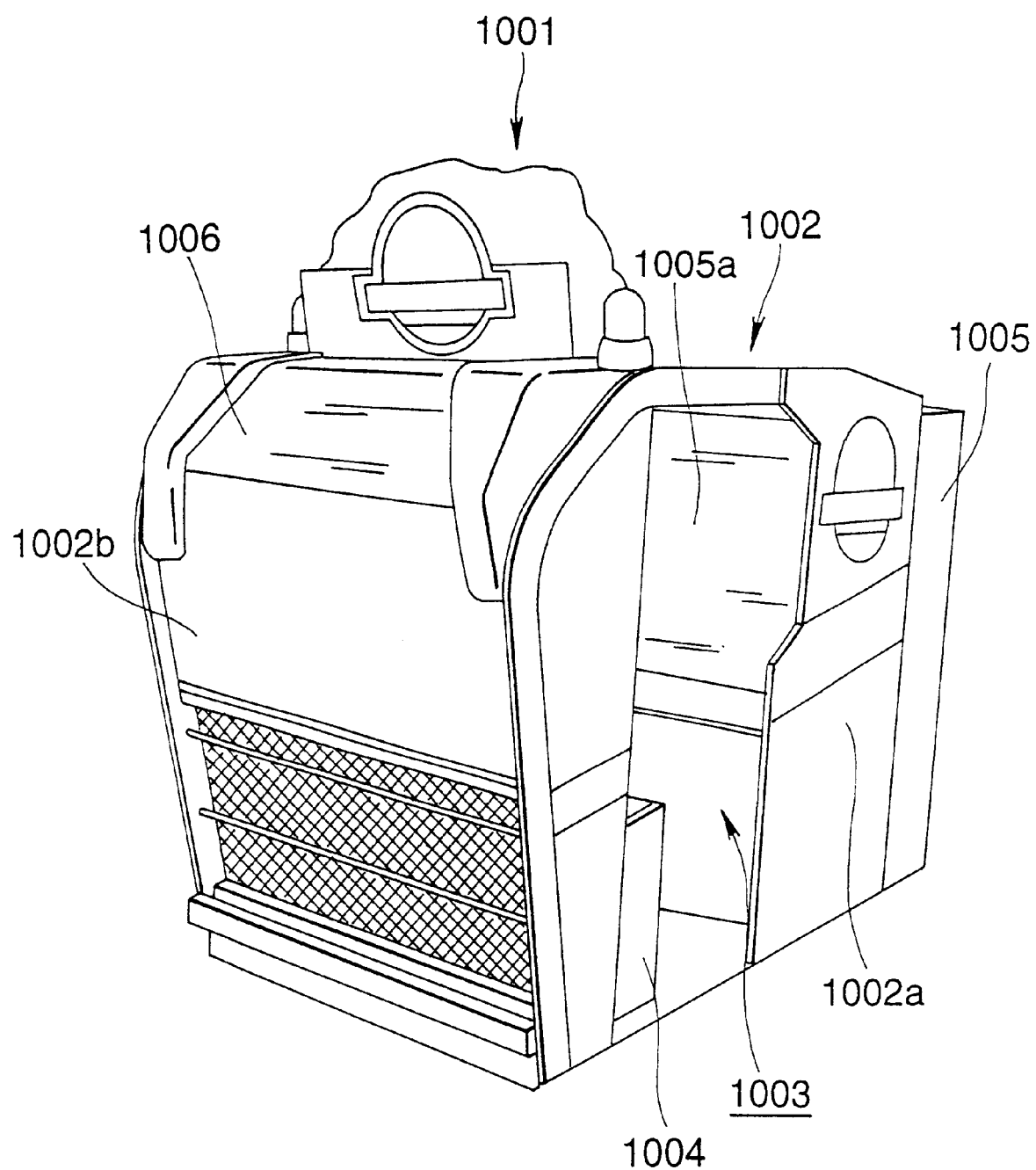
FIG. 27 depicts the appearance of a game unit featuring the use of a stereo sound effect game system in a fourth embodiment of the present invention.
Figure 28:
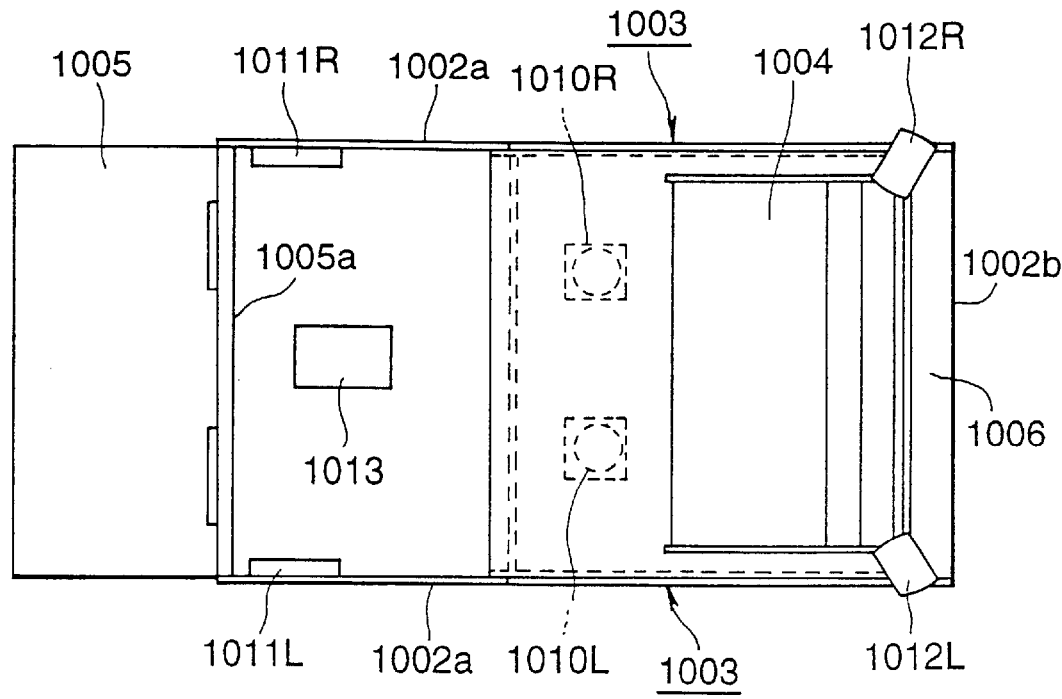
FIG. 28 is a partially abridged plan of the same.

A fourth embodiment of the present invention is described below with reference to FIGS. 27 through 31. FIG. 27 depicts the appearance of a game machine 1001 adapting the stereo sound effects game system in the present embodiment; FIG. 28 is a partially abridged plan; and FIG. 29 is a side view of the same.

A box-shaped booth 1002 housing two players has entrances 1003 opening into left and right sidewalls 1002a, a seat 1004 located inside with the seat back disposed along the rear wall 1002b, and a large screened-television monitor 1005 disposed in front of the seat 1004, with the screen 1005a located facing the front of the players seated in the seat 1004.

The entrances 1003 are partitioned by curtains or the like not shown in the figure. A transparent panel 1006 is placed in the top of the rear wall 1002b to allow people on the outside to view the screen 1005a of the television monitor 1005 inside.

Figure 29:
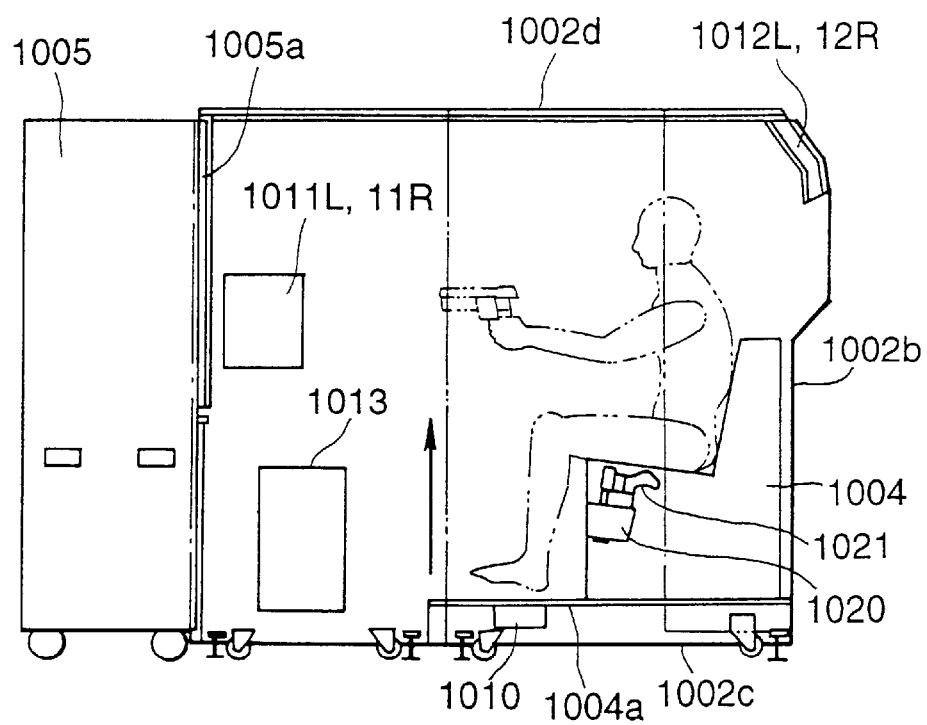
FIG. 29 is a side view of the same.

As shown in FIG. 29, the aforementioned seat 1004 is attached onto a floor 1004a separate from and above the floor 1002c of the booth 1002, and a pair of left and right speaker structures 1010L and 1010R, which are vibration generating sources, are located to the left and right on the bottom face of the foot board component, which extends to the front of the floor 1004a, for the players seated side by side in the seat 1004.

When the left and right speaker structures 1010L and 1010R are driven, they vibrate the undersides of the players' feet and vibrate the entire seat 1004, causing the players seated in the seat 1004 to feel the vibrations transmitted from the buttocks to the waist and back.

Left and right front speakers 1011L and 1011R are located at about the height of the shoulders of the seated players in a location on the inside of the left and right sidewalks 1002a and 1002b near the television monitor 1005.

Left and right rear speakers 1012L and 1012R are located in the left and right corners where the rear wall 1002b joins the upper wall 1002d, these left and right rear speakers 1012L and 1012R being located at a position behind and somewhat higher than the heads of the players seated in the seat 1004, with the left rear speaker 1012L aimed at the player seated on the right, and the right rear speaker 1012R aimed at the player seated on the left. It is thus possible to give the player the experience of broad, uninterrupted stereo sound, whether the player is sitting on the left or the right of the seat 1004.

A woofer 1013, which is a bass center speaker, is located at a low position in the middle of the left and right front speakers 1011L and 1011R. The left and right front speakers 1011L and 1011R are located to the left and right in front of the players seated in the seat 1004, the left and right rear speakers 1012L and 1012R are located to the left and right in back, and the woofer 1013 is located at the center in the front, so that the player is surrounded, as noted above, while speaker structures 1010L and 1010R are located at the feet of the players seated side by side.

Gun holders 1020 are attached to the left and right sides of the seat 1004, so that the game guns 1021 are removably held therein. The game guns 1021 can emit infrared rays when the trigger is pulled.

A plurality of infrared photoreceptors 1022 are disposed, as shown in FIG. 24, in the rectangular frame around the screen 1005a of the television monitor 1005. When the player aims and shoots the gun 1021 at any of the images projected on the screen 1005a, some of the photoreceptors 1022 around the screen 1005a detect the spreading infrared rays, and the infrared detection status of the plurality of photoreceptors 1022 is analyzed to determine the direction in which the game gun 1021 has been fired.

Another method is to set up the plurality of photoreceptors 1022 as infrared-emitting devices around the screen 1005a, and to use the game gun 1021 as a photoreceptor, in which case the infrared rays received by the game gun are analyzed to determine the direction in which the game gun has been fired.

Figure 31:
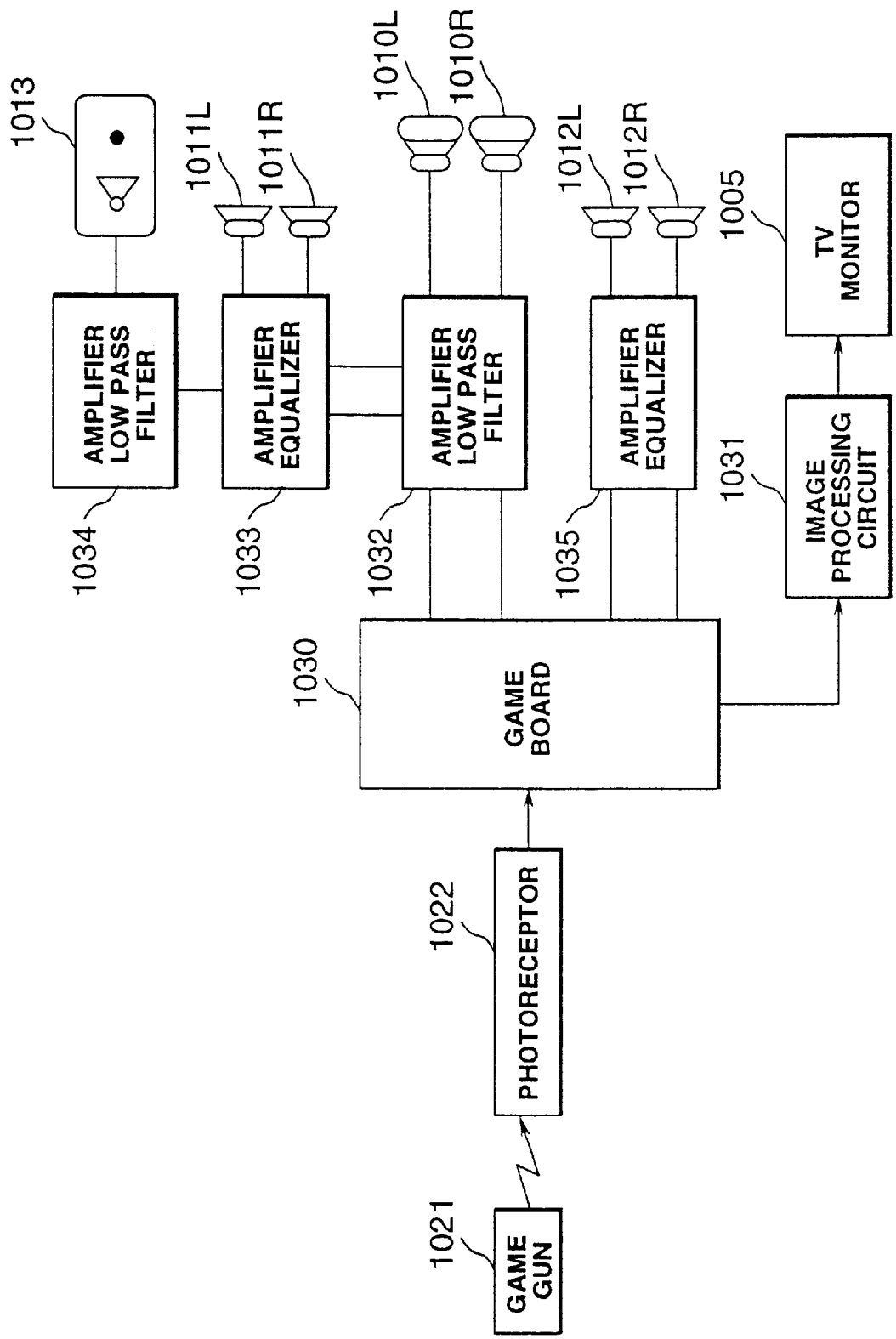
FIG. 31 is a schematic block diagram of the control system for the game unit in the fourth embodiment of the present invention.

FIG. 31 is a schematic block diagram of the control system for this game device 1001. A game board 1030 consisting of a microcomputer allows the game to advance by controlling the television monitor 1005 and the various speakers according to the game program stored in memory.

The detection signals from the aforementioned plurality of photoreceptors 1022 are input to the game board 1030, and the direction in which the game gun 1021 is fired is analyzed based on these detection signals. Designated signals are output from the game board 1030 to the image processing circuit 1031, the image processing circuit 1031 processes images in accordance with the designated signals and outputs the image signals to the television monitor 1005, and the prescribed images are projected on the television monitor 1005.

Voice signals are also separately output from the game board 1030 for the left and right front speakers 1011L and 1011R, while voice signals are also separately output for the left and right rear speakers 1012L and 1012R.

The voice signals output for the left and right front speakers 1011L and 1011R are output through an amplifier 1032 and an amplifier (and equalizer) 1033 to the left and right front speakers 1011L and 1011R, and these left and right front speakers 1011L and 1011R are driven independently of each other to produce sounds. Low-frequency signals of 500 Hz or below are output by the amplifier 1032 through a low pass filter to the left and right speaker structure 1010L and 1010R, which are driven independently of each other to produce vibrations.

Left and right sound signals from the amplifier 1033 are mixed and output to the amplifier 1034, and low-frequency signals of 1 KHz or below are output by the amplifier 1034 through a low pass filter to the woofer 1013 to produce bass sounds.

Voice signals from the game board 1030 for the left and right rear speakers 1012L and 1012R are output through the amplifier (and equalizer) 1035 separately to the left and right rear speakers 1012L and 1012R to produce sounds that are independent of each other.

As described above, the game board 1030 forms four sound sources independent of each other for the left and right front speakers 1011L and 1011R and left and right rear speakers 1012L and 1012R, outputs voice signals for each, and drives the corresponding speakers through amplifiers and equalizers to produce sounds independently of each other.

As such, the left and right front speakers 1011L and 1011R in front of the players seated on the seat 1004 and the left and right rear speakers 1012L and 1012R in back produce sounds independently of each other, allowing the locations of sounds around the players to be freely changed in order to reproduce extremely realistic stereo sound, while the reverberation of the bass sounds from the woofer 1013 in the center in front of the players is synchronized with images on the television monitor for more exciting and effective stereo sound effects.

The voice signals for the left and right front speakers 1011L and 1011R are used to drive the speaker structures 1010L and 1010R by way of a low pass filter to produce vibrations, so that players can experience vibrations such as the ground shaking underfoot through the whole body simultaneously with the stereo sound effects, and can thus enjoy a more exciting experience under the illusion that they are in the midst of danger.

The combined control of the amplitude of the vibrations from the speaker structures 1010L and 1010R and the volume of the speakers allows more effective stereo sound effects to be created without high noise levels.

Figure 30:
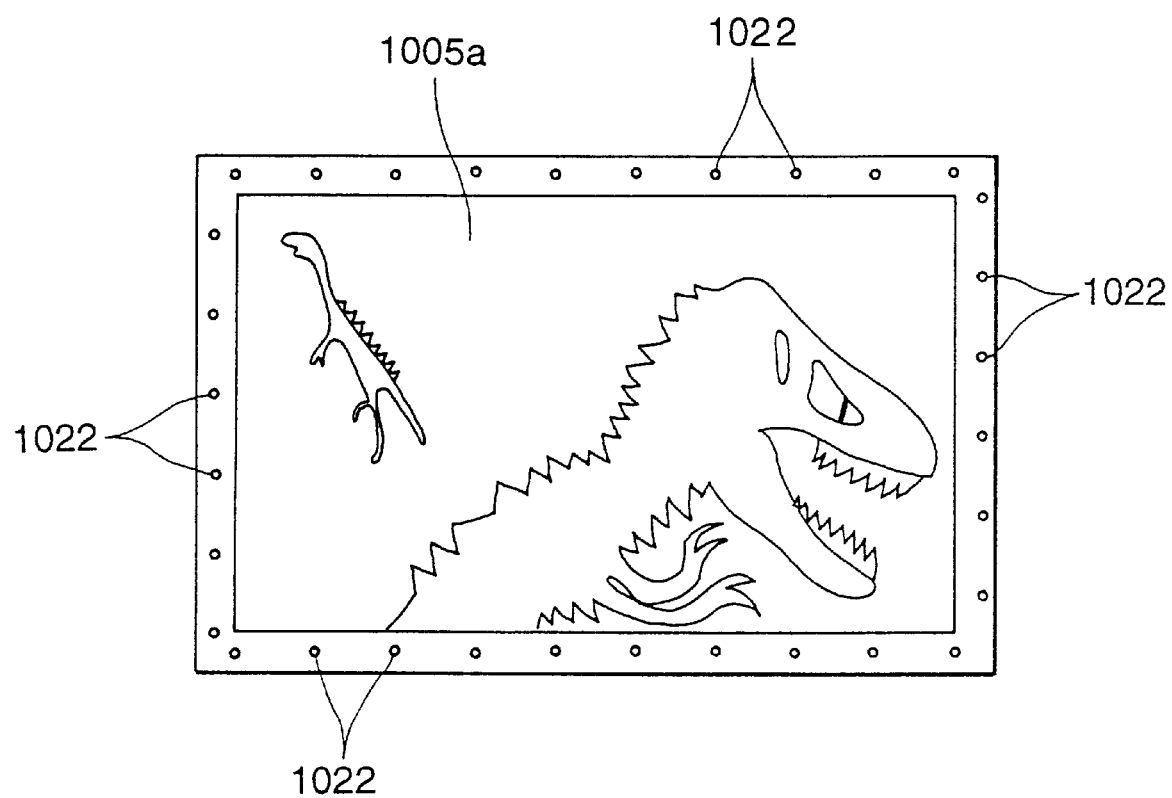
FIG. 30 is a front view depicting an example of the screen of a television monitor in the fourth embodiment of the present invention.

In this game device 1001, a dinosaur game is incorporated in the game board 1030, dinosaurs appear on the screen 1005a of the television monitor 1005, as shown in FIG. 30, sounds and vibrations are produced while synchronized with the movements of the dinosaurs, and even when the dinosaurs move out of visible range from the screen 1005a, sounds and vibrations of dinosaurs moving around the players can still be experienced.

Players can thus enjoy shooting by operating the game gun 1021 to shoot dinosaurs represented by images on the screen 1005a, direct hits can be determined by the direction in which the game gun 1021 is fired, images and noises of dinosaurs being killed indicate when they have been hit, and other images and noises indicate when they have not been hit. Sounds of firing game guns 1021, sounds of bullets flying in the direction in which they have been fired, and other sounds are also realistically reproduced.

Since there is no need for players to wear headphones, there are no troubles associated with wearing headphones or discomfort resulting from their use, allowing players to be more easily absorbed in a more natural state by the separate world of the game.

Once players thus begin the game in the booth 1002, they are immersed in a world populated by Jurassic dinosaurs of the Mesozoic age among the geological ages of the earth, and can enjoy an exciting virtual experience and game in which the game gun 1021 is used for protection against the dinosaurs.

Fifth Embodiment

Figure 32:
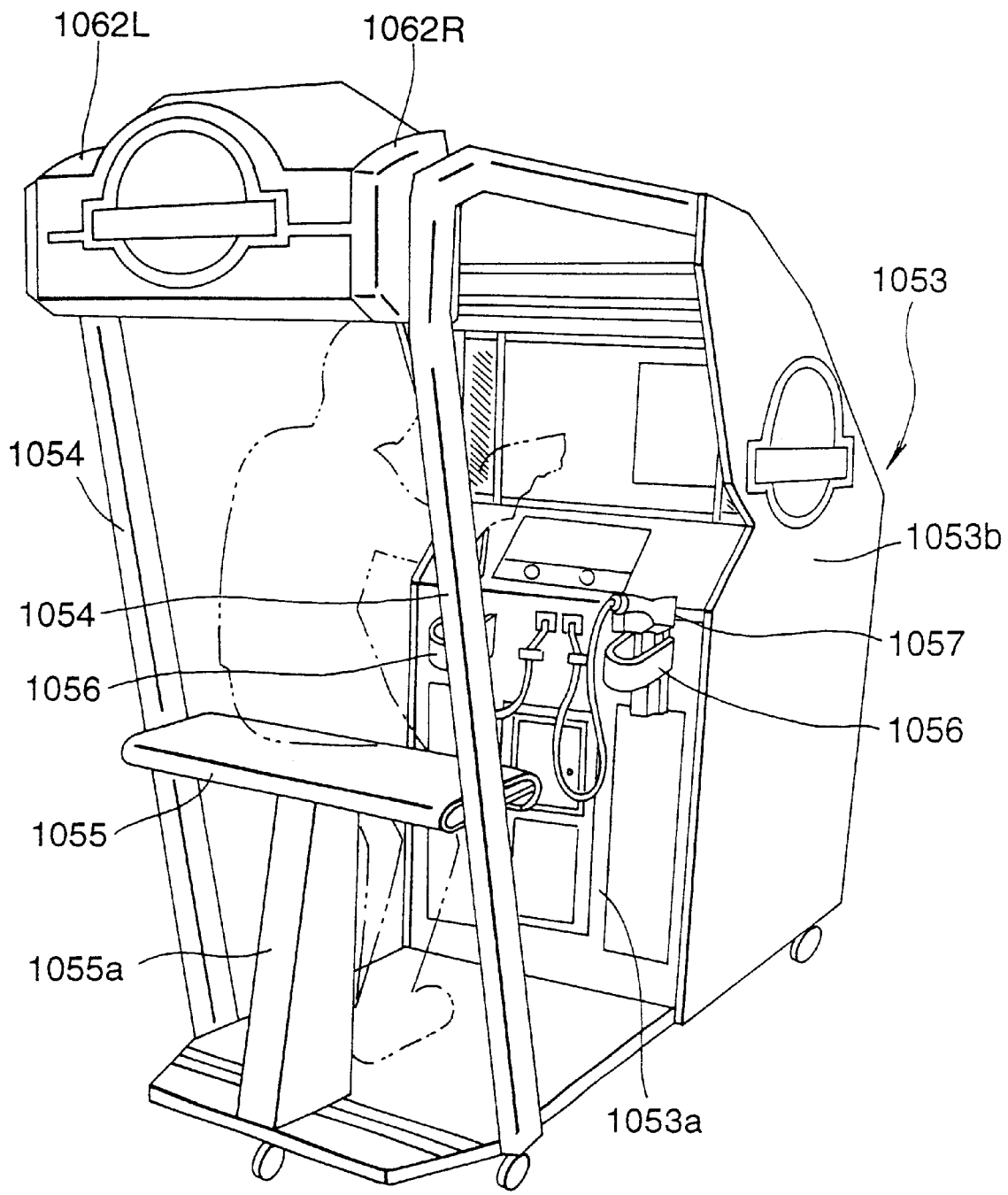
FIG. 32 depicts the appearance of a game unit featuring the use of a stereo sound effects game system in a fifth embodiment of the present invention.
Figure 33:
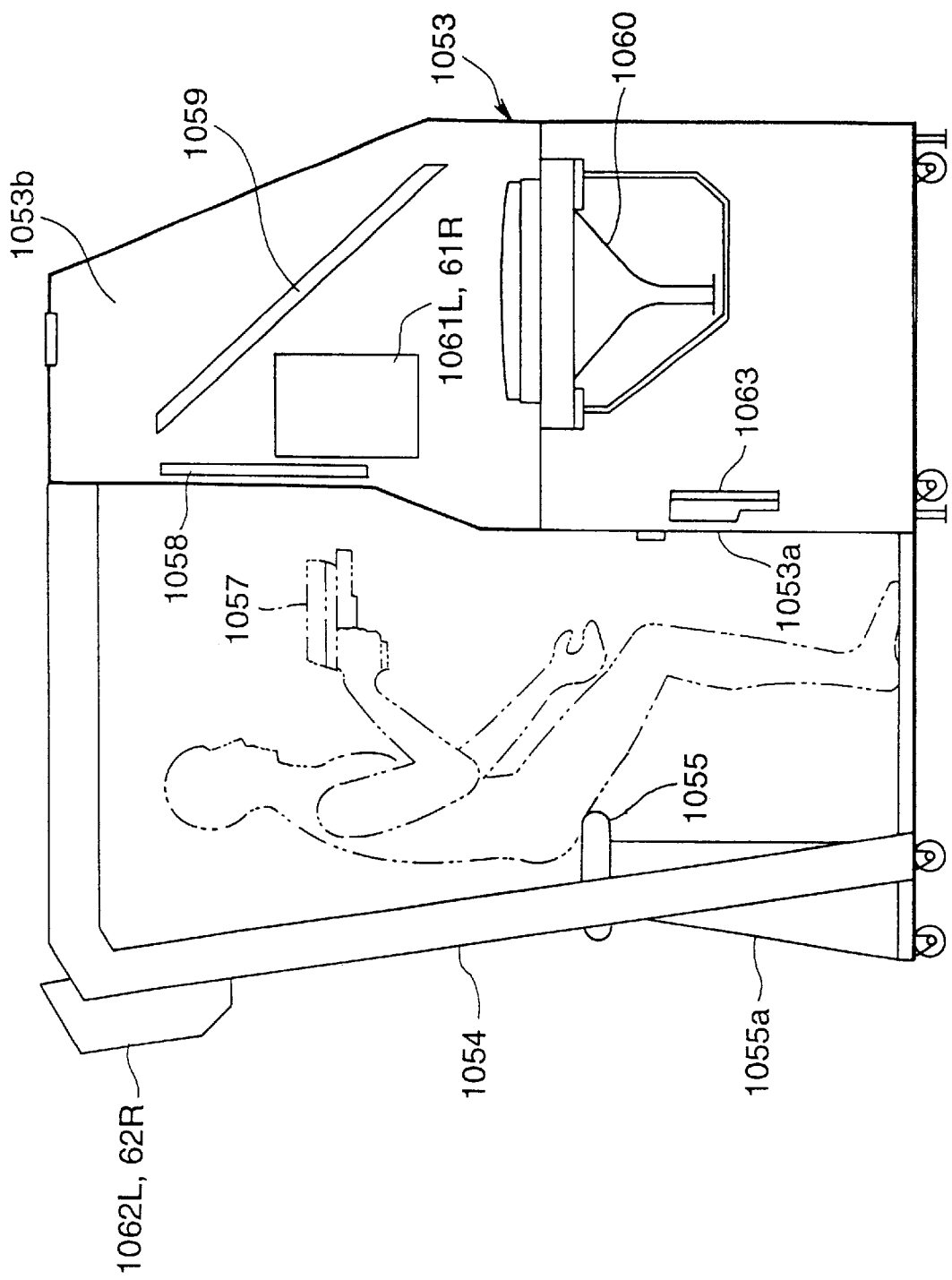
FIG. 33 is a partially abridged side view of the same.

Another game device 1051 in a fifth embodiment is described below with reference to FIGS. 32 and 33. This game device 1051 is simple, where the booth 1052 is composed of a cage 1053 housing a television monitor 1060, and a pair of left and right frames 1054 which extend horizontally back from the top left and right of the cage 1053 and are then bent back at the rear end to hang down at a slight incline.

A seat 1055, which is supported by a leg component 1055a standing in the center of the left and right frames 1054 and which is suspended between the left and right frames 1054, is located in the back of the cage 1053. A pair of gun holders 1056 are located to the left and right in the vertical wall 1053a in the front side of the cage 1053, and are used to hold the game guns 1057.

The upper part of the vertical wall 1053a is a transparent panel 1058, a mirror 1059 is disposed at an incline in the interior of the transparent panel 1058, and a television monitor 1060 is held with the screen facing up under the mirror 1059. Accordingly, the images shown on the screen of the television monitor 1060 are reflected in the mirror 1059 and are seen through the transparent panel 1058 by the player seated in the seat 1055.

Left and right front speakers 1061L and 1061R are attached at locations about the same height as the mirror 1059 on the inside surface of the left and right side walls 1053b of the cage 1053, and a woofer 1063 is attached to a location in the bottom center on the back side of the aforementioned vertical wall 1053a. Left and right rear speakers 1062L and 1061R are located in the bent part where the vertical and horizontal components of the left and right frames 1054 intersect.

Two players can sit on the left and right in the seat 1055, the left and right front speakers 1061L and 1061R are located to the left and right in front at a height somewhat lower than the heads of the players, the left and front rear speakers 1062L and 1062R are located to the left and right in back higher than the heads of the players, and a woofer 1062 is located in the center before the feet of the players.

In this game device 1051, the left and right front speakers 1061L and 1061R and the left and right rear speakers 1062L and 1062R are each driven by voice signals to produce sounds based on separately formed sound sources, so the positions of the sounds around the players can be freely varied to reproduce extremely realistic stereo sound, despite the simple design, and the bass sounds from the woofer 1063 also reverberate in the center in front of the players and are synchronized with the images on the monitor television, so as to produce more exciting and effective stereo sound effects.

Sixth Embodiment

The aforementioned embodiments of the invention were used for more realistic processing of images and sound effects, but special effects such as the use of air blasts or physical actions including rotation, vibration, and shaking may be adopted to provide an even more realistic game machine. A sixth embodiment is described below with reference to FIGS. 34 through 41.

Figure 34:
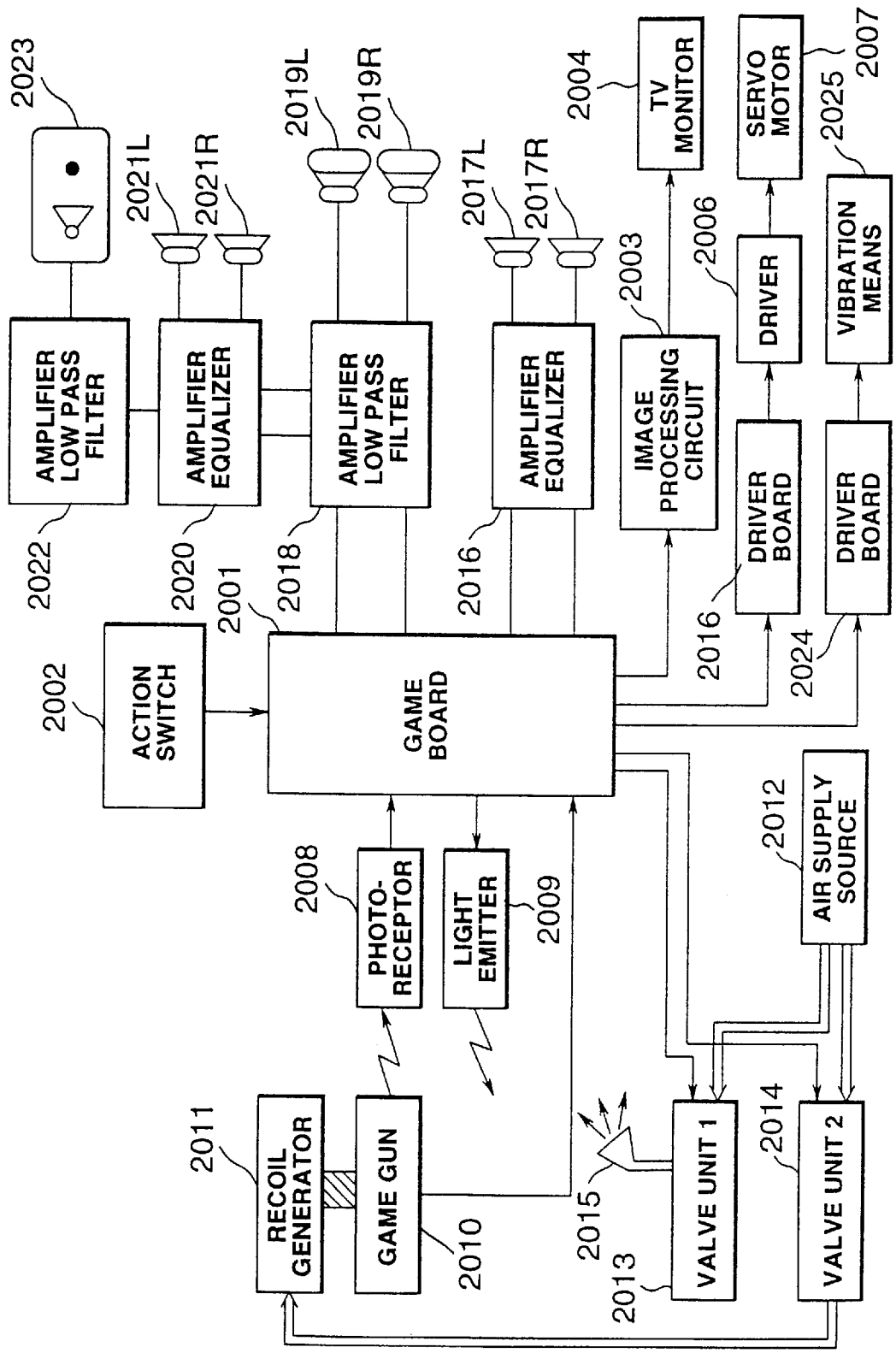
FIG. 34 is a schematic block diagram of the control system of a game unit in a sixth embodiment of the present invention.

FIG. 34 is a block diagram of the functions of the game machine in the sixth embodiment of the present invention.

An action switch 2002 is provided to enable operations other than operations based on game guns, such as buttons for assisting people. A driver board 2005 receives signals from the game board 2001 to rotate the seat (ride) which seats two (or more) players, produces drive signals, and provides the signals to the driver 2006. A servo motor 2007 is rotated by the output from the driver 2006. The servo motor 2007 is a motor for rotating the rotatable seat, and is disposed on a rotating axle or around it. The direction of the seat is thus rotated or vibrated by the control of the game board 2001.

The players shoot dinosaurs (enemies) on the screen using the game gun 2010, but in some cases light-emitting devices 2009 are provided on the TV monitor side for the game gun 2010, as in the third embodiment, while in other cases photoreceptors 2008 are provided on the TV monitor side as in the fourth embodiment. The game gun 2010 is provided with a recoil generating device 2100 that creates the sensation of recoil just as if bullets were actually being fired. When the trigger of the game gun 2010 is pulled, a valve unit 2 (2014) is opened by the control of the game board 2001, air from an air supply source 2012 is supplied, and the recoil generating device 2011 generates recoil. The detailed structure and action of the recoil generating device are described below.

Valve units 2013 and air blowing holes 2015 are special effects devices for blowing air onto the players to further enhance the sense of actually being in the scene. For example, when enemies rush up, air can be blown to create a sense of their breathing, and air can be blown to create the sense of spurting blood when an enemy has been killed.

Driver boards 2024 and vibration means (bass shakers) 2025 are intended to make players feel vibrations and the like when enemies approach. Such vibration means 2025 are commercially available (such as Aura in the United States), and can produce a variety of sound effects such as shaking ground and vibrations.

The game board 2001, image processing device 2003, TV monitor 2004, photoreceptor elements 2008, amplifier and equalizer 2016, speakers 2017L/R, amplifier and low pass filter 2018, speakers 2019L/R, amplifier and equalizer 2020, speakers 2021L/R, amplifier and low pass filter 2022, and woofer 2023 are the same as or equivalent to those indicated in the first through fifth embodiments.

Figure 35:
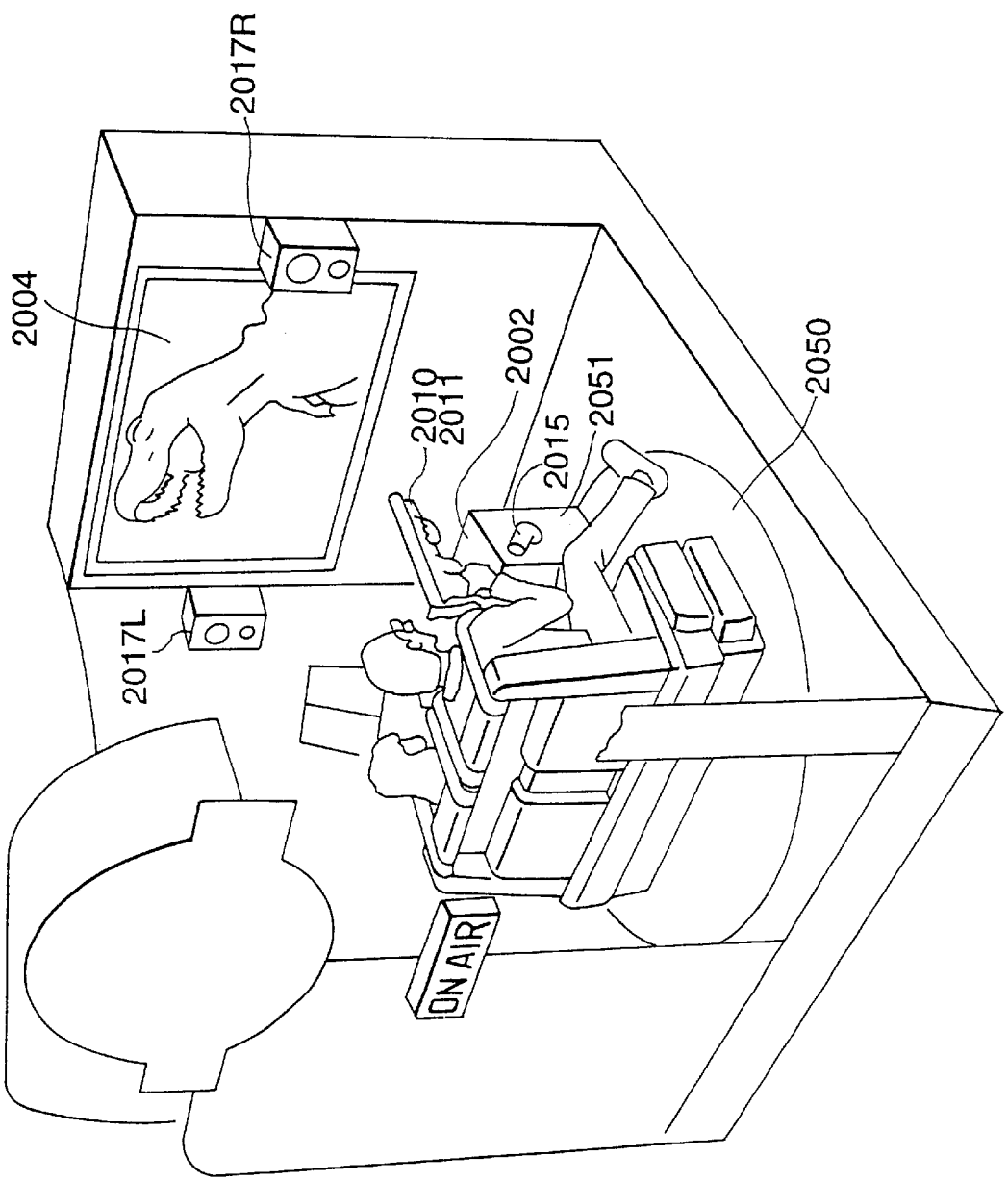
FIG. 35 is an oblique view of the game machine in the sixth embodiment of the present invention.

FIG. 35 is an oblique view of a game machine in an embodiment of the present invention (a partial cutaway showing the interior). The game machine is in the form of a box, the interior of which becomes dark when the player closes the door. A rotating platform (turn table) is located about in the center of the game machine, and a seat accommodating two players is attached on top. As the rotating platform 2050 turns, the players variously face the front and back and to the left and right. A pedestal 2051 is located in front of the players. Holsters for accommodating the game guns 2010 and 2011 and air blowing holes 2015 are located in the pedestal. A valve unit 2013 is provided in the interior.

Figure 36:
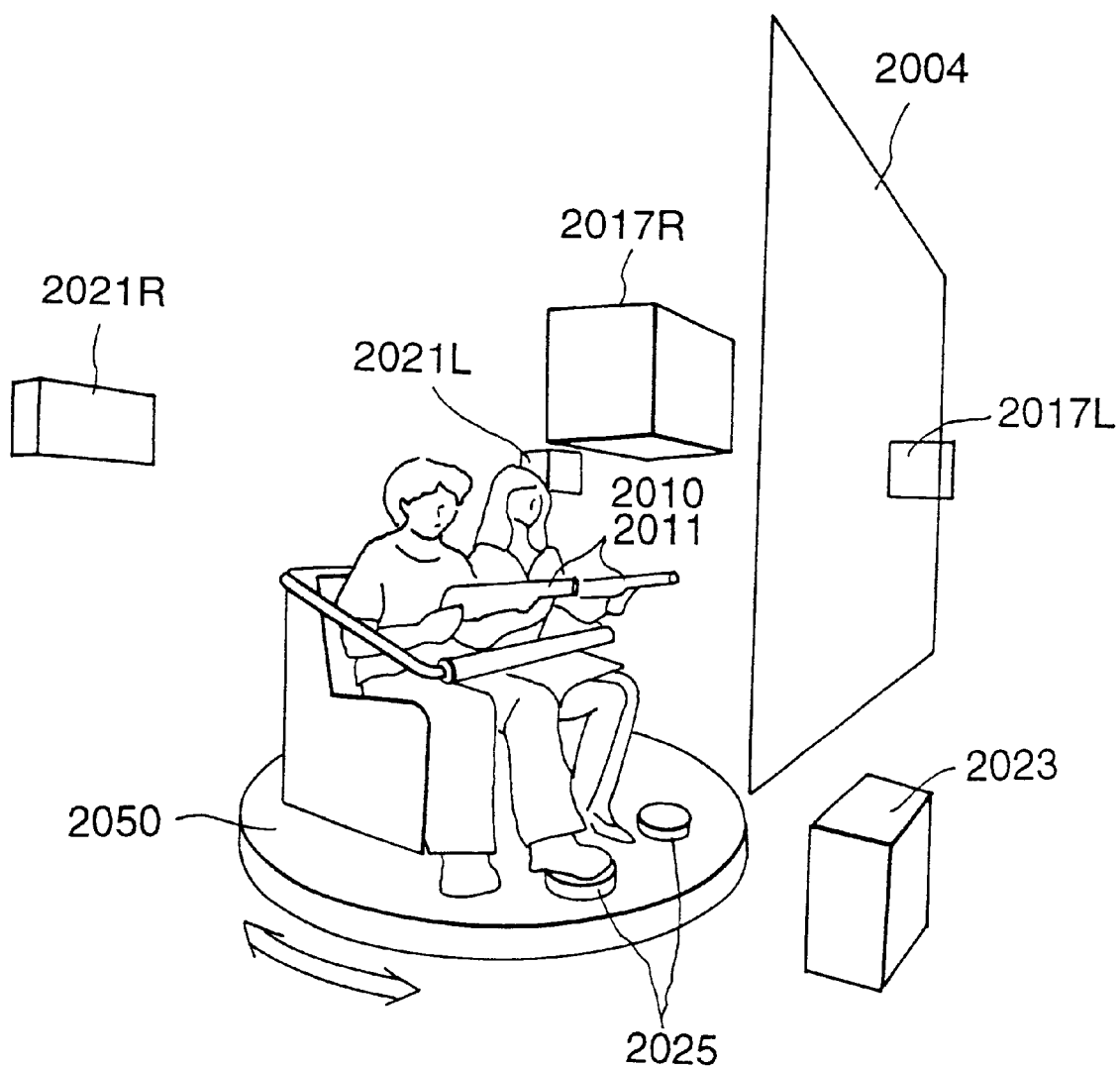
FIG. 36 an illustration of the operation of the game machine in the sixth embodiment of the present invention.

FIG. 36 is a perspective diagram illustrating the operation of the rotating platform 2050. The pedestal 2051 is not shown in this diagram. The vibration means 2025 is located just at the feet of the players on the rotating platform 2050. In the past, this type of vibrating means 2025 was often located in the seat (part touching the waist), but since the sensation in the waist area is relatively acute, the vibrations end up being felt only in this part of the body and cannot be felt throughout the entire body, with a diminished sense of actually being in the scene. Since, by contrast, the sensation in the feet is not all that acute, vibrations can be felt throughout the entire body as a result of the layout in the locations in FIG. 36. This structure can produce the sensation of shaking ground.

Figure 37:
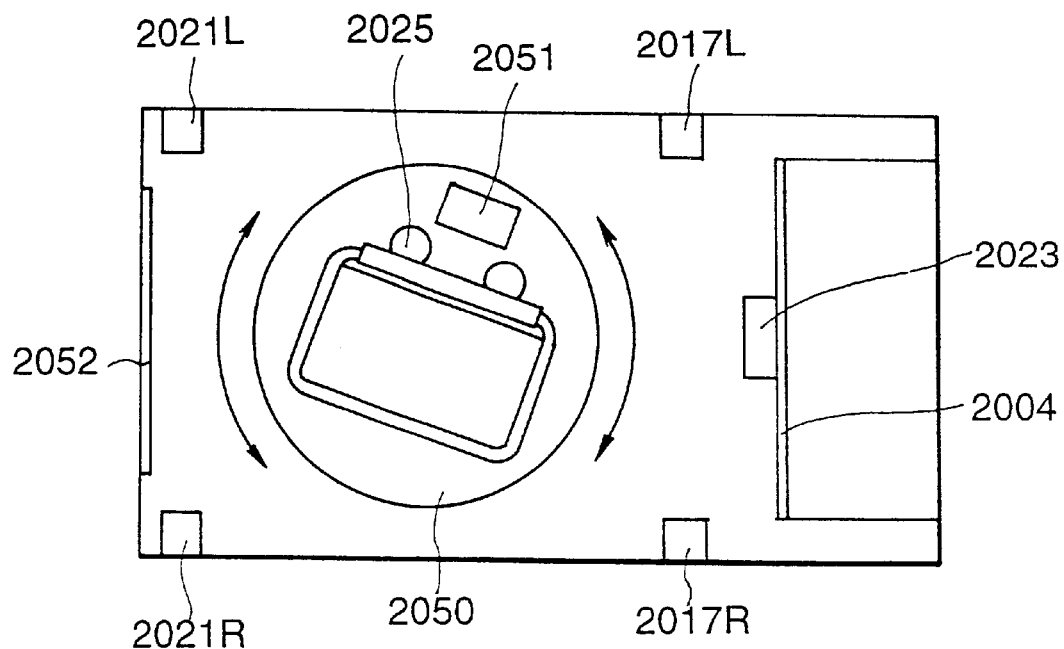
FIG. 37 is a schematic plan of the game machine in the sixth embodiment of the present invention.

FIG. 37 is a schematic plan of the game machine. In the figure, an entrance 2052 is located on the side opposite the TB monitor 2004, with the rotating platform 2050 in between. FIGS. 36 and 37 reveal that speakers 2017L/R are located on the TV monitor 2004 side, and that speakers 2021L/R are located on the entrance 2052 side(back side). The woofer 2023 is located under the screen of the TB monitor 2004.

Figure 38:
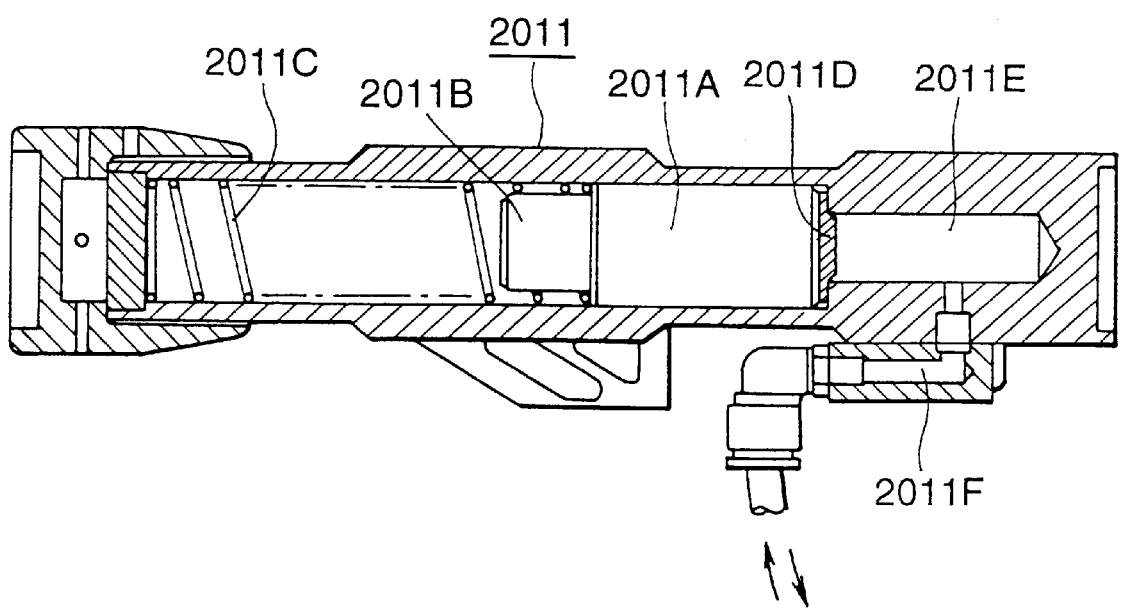
FIG. 38 is a cross section of a recoil generating device in the sixth embodiment of the present invention.
Figure 39:
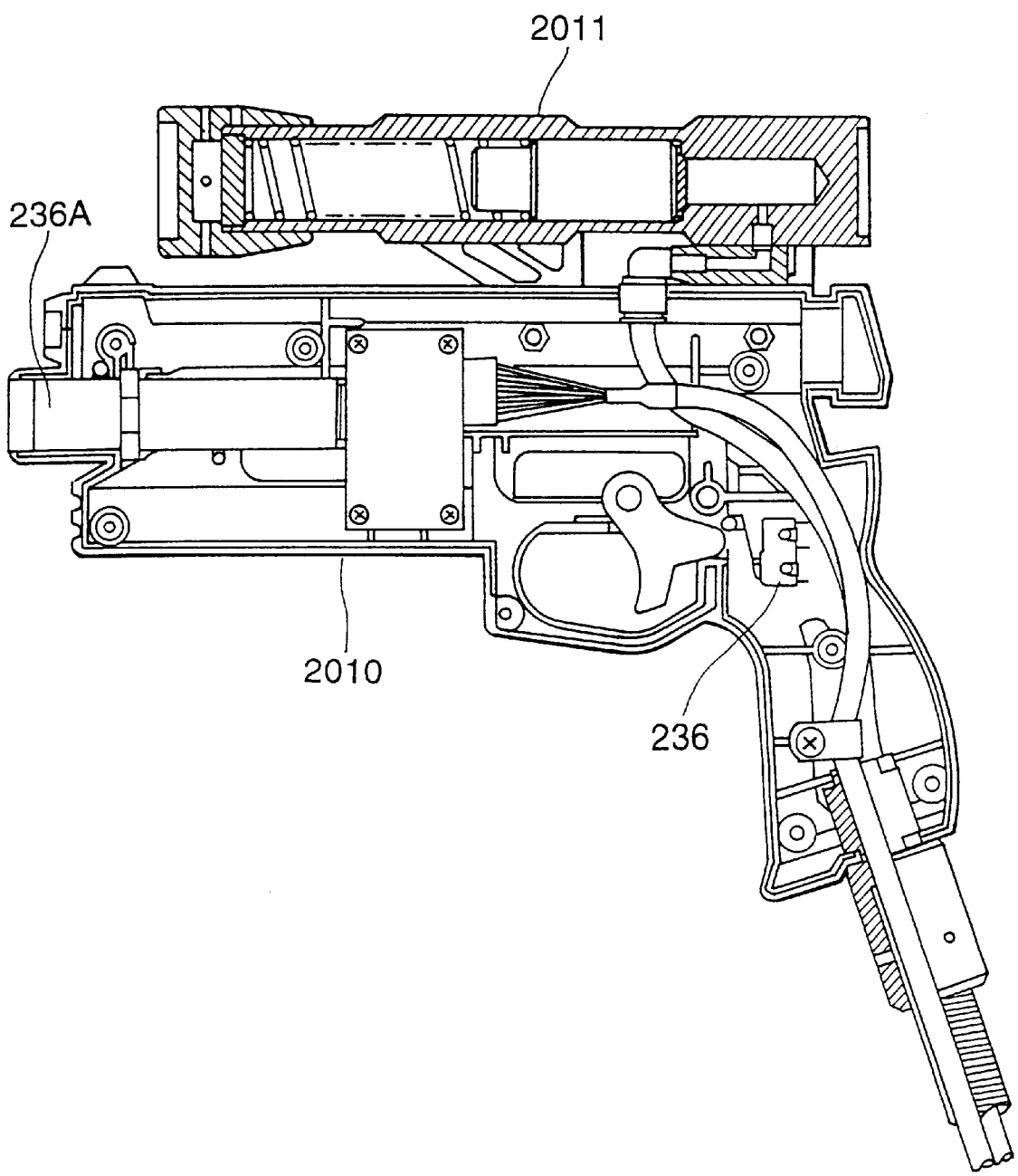
FIG. 39 is a cross section depicting the recoil generating device attached to the game gun in the sixth embodiment of the present invention.

FIG. 38 is a cross section depicting the detailed structure of the recoil generating device 2011. FIG. 39 depicts the recoil generating device 2011 attached to the game gun 2010. As shown in the figures, the external shape of the recoil generating device 2011 is patterned on a gun sight scope, and thus will not seem strange when attached to the game gun 2010. The recoil generating device 2011 is equipped with a cylinder 2011A, a weight 2011B that moves inside the cylinder 2011A, an elastic member (coil spring in the figure) 2011C for pressing the weight 2011B against a cushion 2011D when no air is introduced, an empty component 2011E (the empty component facilitates operation) communicating with the cylinder 2011A by way of the cushion 2011D, and a feed tube 2011F for introducing air through the empty component 2011E into the cylinder 2011A. When no air is introduced, the weight 2011B is at the right end, but when air is introduced, the pressure moves the weight to the left side. The recoil action of this operation provides the game gun 2010 with recoil just as if a bullet had been fired. The intensity of the recoil can be adjusted by varying the air pressure, heaviness of the weight 2011B, inside diameter of the cylinder 2011A, and the spring constant of the elastic member 2011C.

After air has been introduced, the other end of the feed tube 2011F not shown in the figure is opened to the atmosphere, and the air in the cylinder 2011A is discharged into the atmosphere. As a result, the weight 2011B is pressed against the cushion 2011D and is returned to its original state.

In order to effect the aforementioned operations, the valve unit 2013 is operated in the following manner under the control of the game board 2001. When the trigger of the game gun 2010 is pulled, the microswitch 236 is activated, and prescribed signals are sent to the game board 2001. The game board 2001 immediately opens the electromagnetic valve of the valve unit 2013 to connect the feed tube 2011F to the air feed source 2012. The period for which it is connected varies according to the degree of recoil. The other electromagnetic valve of the valve unit 2013 is then opened to open the feed tube 2011F to the atmosphere. When air has been extracted into the cylinder 2011A, the electromagnetic valve is closed. This series of operations takes a short time of no more than 1 second, for example. The operating time can be adjusted to adjust the magnitude of the recoil, the firing interval, or the like.

In the example given in FIGS. 38 and 39, recoil and reciprocation are accomplished by the combination of the cylinder and elastic member, but the cushion 2011D, empty component 2011E, and feed opening 2011F may also be provided symmetrically on both sides of the cylinder. No elastic member is needed in this structure. Various levels of recoil can be created by adjusting the opening position of the valve units connected to the feed openings at both ends.

Recoil generating devices 2011 that use air can be made more compact and light-weight than when a solenoid coil is used. This provides considerable advantages when attached to the game gun as shown in FIG. 39.

Since the recoil generating device protrudes, a cushion should be attached for better safety.

The operations are described below.

The game machine in this embodiment rotates and vibrates the seat (ride), blows air, and the like in addition to showing the game screen, making it possible to provide a game in which the player feels even more strongly a sense of being in the scene. The game board 2001 performs the various types of control described above in addition to processing signals from the game gun and controlling the screen. These points are described below with reference to the flow charts in FIGS. 40 and 41.

Figure 40:
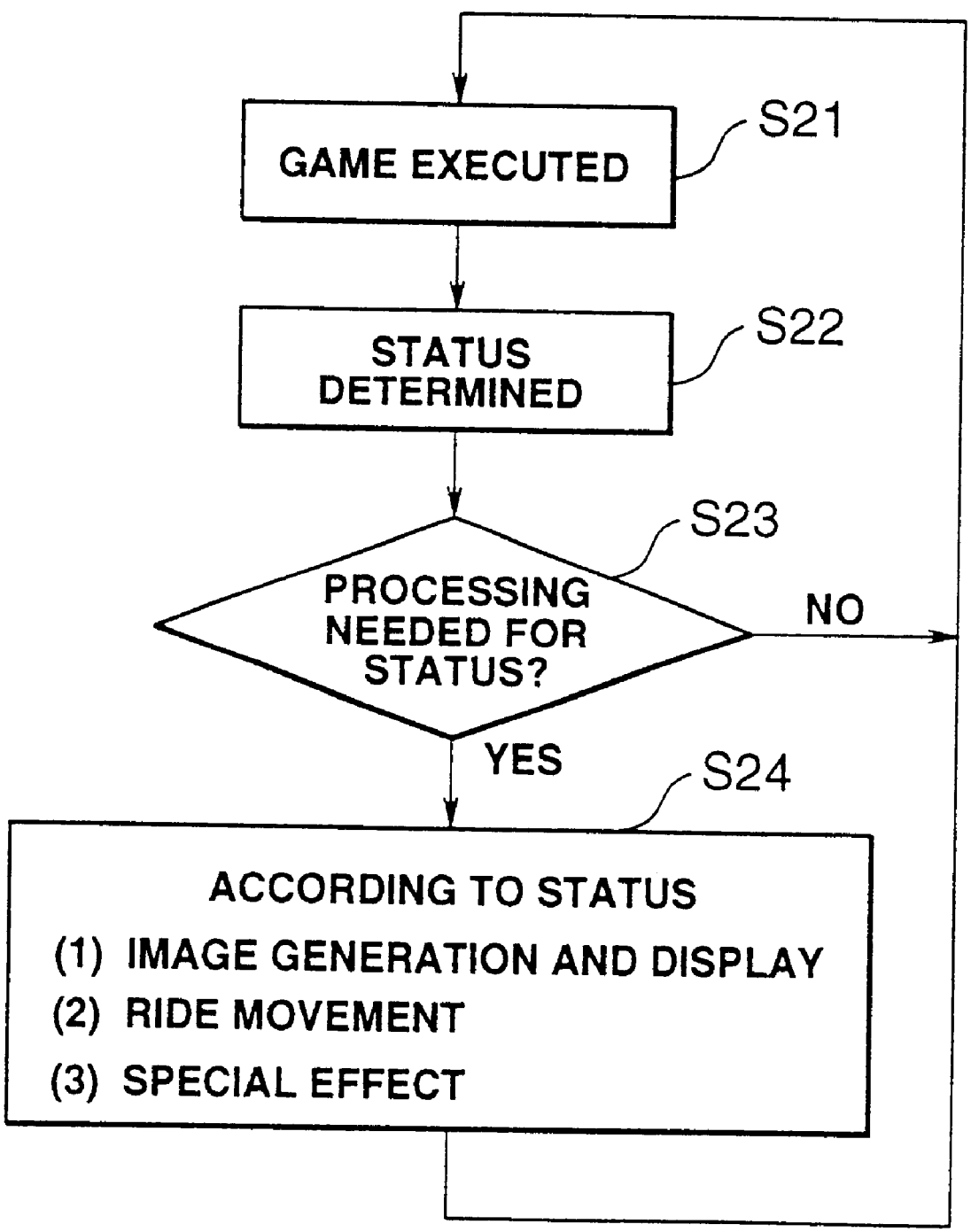
FIG. 40 is a schematic flow chart of the process for determining the status in the sixth embodiment of the present invention.

FIG. 40 is a flow chart summarizing the process. When the situation normally played in the game changes (S21), the situation at that time is determined (S22). It is determined whether or not the situation requires processing for that situation (S23), and the procedure moves on to step S24 when processing is required (YES). When it is not required (NO), the procedure returns to step S21, and the game continues. In step S24, (1) a screen is generated and displayed, (2) the ride is driven, (3) and special effects are executed, as warranted by the situation.

Figure 41:
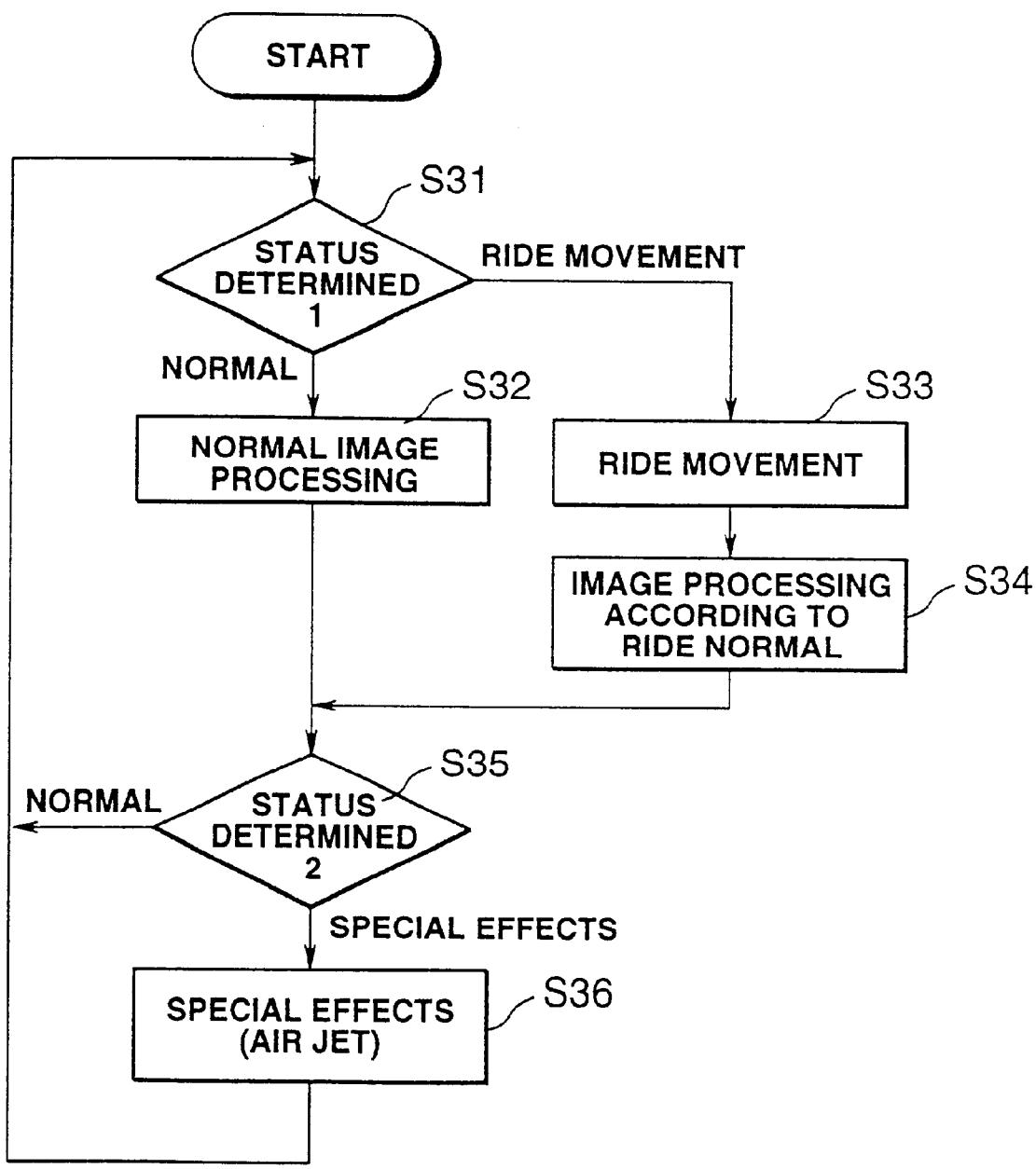
FIG. 41 is a detailed flow chart of the process for determining the status in the sixth embodiment of the present invention.

FIG. 41 is a more detailed flow chart of the process from steps S22 through S24 in FIG. 40. First, a determination 1 is made as to whether or not the ride is to be driven (S31), and when the ride is not to be driven, the normal game is processed (S32), whereas when the drive is to be driven, the ride is driven at the prescribed speed and angle (S33), and images are processed in accordance with the movements of the ride (S34). Steps S33 and S34 may be done in reverse or simultaneously. The four following types of ride movements are possible.

(1) Position Change

For example, when the game begins or ends, the seat can be rotated from the entrance to the screen or the opposite. The rotating platform 2050 at this time moves considerably (about 180 degrees).

(2) When the Vehicle in Which the Player is Traveling Moves During the Game

Examples include one large shake when the vehicle turns corners, a swinging type of shaking when crossing a suspension bridge, a jiggling type of shaking when traveling a gravelly road, a considerably jolting type of shaking when traveling rough roads, and turning the handle to escape from the enemy. The shaking preferably tilts a maximum of 45 degrees from the center. That is because the angle must allow the player to fire the gun.

(3) When Players Are Eaten by Enemies

When, for example, a player fights a dinosaur appearing on the screen but is eaten by the dinosaur, the rotating platform moves slowly to a considerable extent in a manner congruent with the movement of the dinosaur's mouth on screen.

(4) When a Player Sustains Damage

Examples include when a dinosaur strikes the vehicle in which the player is riding on screen, or when a player strikes an impediment on screen. In such cases, the extent of rotation is determined according to the size, speed, or movement of the encountered object.

A status determination 2 is then made as to whether or not to execute special effects (S35), and the procedure returns to the initial process to repeat the series of processes when no special effects are to be executed (S36).

Images are processed in accordance with the movements of the ride (S34), but in the case of (2), (3), and (4) above, the display images change with the movement of the seat. For example, when the direction of the vehicle changes to flee from an enemy, the enemy which was seen ahead is now seen to the side, and the images are displayed accordingly. At this time, the direction in which the player is facing does not face the screen. This makes it difficult to aim with the game gun 2010 at the enemy, but this all the more enhances game enjoyment. The extent to which the rotating platform 2050 actually rotates at this time may, but does not have to be, completely aligned with the extent to which the display images change. For the sake of enhancing game enjoyment, it is preferably not completely aligned. For example, if the rotating platform 2050 is rotated 180 degrees when the car handle is turned 180 degrees, the player will be facing away from the screen, making it extremely difficult to shoot, so it can actually be rotated 360 degrees, or reciprocally rotated 180 degrees, or alternatively the screen display can be aligned to 180 degrees of rotation. Conversely, when the vehicle crosses a suspension bridge, more shaking than would actually be the case can further heighten the sense of actually being in the scene.

A specific example applying the aforementioned processing from the beginning to the end of a game is given.

(Game Not Started) Nothing is displayed on the screen, and the seat faces the entrance. The seat safety bar is up.

(Getting Ready to Start Game) The safety bar drops down when players take a seat. Players hold game guns 2010. The door closes. When this state has been determined, the sounds of a closing door and a key turning come from the speakers as special effects.

(Game Begins) After the sound effects, the seat is rotated by the rotating platform 2050 to face the screen.

(Game Stage Cleared) The seat is rotated to face the entrance to get ready for the beginning of the next stage.

(Ride Ends, Game Over) A map and the game results are displayed. The seat is then rotated to face the entrance and encourage the players to depart.

(When the Ending Has Been Reached) The ending screen is displayed with special effects. Game results are also displayed. The outcome of the game is displayed.

The following are cases of air jet special effects. (1) When the enemy roars, according to magnitude and duration, (2) when the enemy spits poison, (3) when the enemy appears from under water, (4) when a helicopter approaches, (5) when an explosion occurs, (6) when a door or passageway opens, and (7) when a glass window breaks.

INDUSTRIAL APPLICABILITY

As described above, in the present invention, the position of the view point is established based on the situation between predetermined objects defined in three-dimensional virtual space, making it possible to provide an image processing unit which is capable of displaying images suitable for given situations and which displays more exciting images that are easier to manipulate. It is also able to provide a screen that is easier to see and play.

Also in the present invention, the screen is divided into a plurality of areas for a plurality of players in a shooting game that can be played by a plurality of players, the plurality of divided areas are matched with the plurality of players, and a back-up score calculating means is provided to calculate the back-up score based on the shooting results on a player's own screen and the shooting results on another player's screen, allowing players to be rated according to the aforementioned back-up score, which makes the game more Interesting.

The present invention also makes it possible to provide a game device in which the game presentation is not limited, allowing a variety of presentation images to be realized.

The present invention is also equipped with position calculating means for calculating the coordinate position of a peripheral device relative to the display screen in real time, and is also equipped with presentation changing means for changing the game presentation displayed on the display screen on the basis of the calculated results, allowing the sighting position of the muzzle to be computed or detected in real time, that is, in shorter fixed periods of times such as every ⅟₆₀th second, which is the imaging time, for example, so that the game presentation is not limited, and a variety of presentation images can be realized.

In the present invention, the aforementioned game gun is equipped with a recoil generator for simulating recoil when the game gun is fired, allowing the player to experience recoil while firing the gun, with a heightened sense of actually being in the scene.

Since the aforementioned recoil generator in the present invention is operated by air, it can be made more compact, more light-weight, and more reliable.

The present invention is equipped with a booth for housing players, a television monitor disposed in front of players in a fixed location inside the aforementioned booth, a plurality of speakers disposed around the players seated in the aforementioned specific location, speaker driving means constituting independent sound sources for each of the aforementioned plurality of speakers and for creating integrated stereo sound effects, image control means for projecting images on the aforementioned television monitor, and central control means for outputting designated signals to the aforementioned speaker driving means and the aforementioned image control means as the game unfolds and for allowing the game to advance while synchronizing the sounds and images, so that the central control means creates stereo sound effects by outputting the designated signals to the speaker driver means and image control means as the game unfolds and by independently driving the speakers surrounding the players while synchronizing the sounds and images, thereby allowing players to experience stereo sound effects corresponding to the game situation which changes in real time. The plurality of speakers disposed around the players are driven and controlled using the various independently formed sound sources, allowing the location of sounds around the players to be freely altered to reproduce extremely realistic stereo sounds, and allowing more effective stereo sound effects to be realized while synchronized with the images on the television monitor. Since no headphones are used, the troubles associated with wearing them are eliminated. The players in the booth are isolated from the external world, and are also visually and acoustically separated from external factors, allowing the stereo sound effects to be even further enhanced.

The present invention is equipped with vibration means situated at the feet of the player in the aforementioned specific location and a vibration driving means for driving the aforementioned vibration means, wherein the aforementioned vibration driving means produces vibrations by driving the aforementioned vibration means by means of designated signals from the aforementioned central control means, the central control means creates stereo sound effects by outputting designated signals as the game unfolds to the speaker driving means and image control means, and by matching the sounds and images, while at the same time outputting designated signals to the vibration driving means as the game unfolds to drive the vibration means and vibrate the feet of tie player, thereby making for an even more realistic and exciting experience.

The present invention is also equipped with a booth for housing a player, a display component located inside the aforementioned booth, image generating means for generating images displayed on the aforementioned display component, rotation means for rotating the direction in which the aforementioned player is facing, and rotation control means for rotating the aforementioned rotation means, wherein the aforementioned rotation control means rotates the aforementioned rotation means as the game unfolds, and the aforementioned image generating means changes images according to the rotation, so that the players are rotated along with the movements of the characters in the game scenario, and the images are changes with the rotation, further heightening the sense of being in the scene.

The present invention is also equipped with a booth for housing a player, a display component located inside the aforementioned booth, image generating means for generating images displayed on the aforementioned display component, and special effects generating means for giving special effects to heighten the player's sense of being in the scene as the game unfolds, resulting in a more exciting experience with unexpected effects for players.

What is claimed is:

1. An image processing unit, comprising:

shape memory in which object shape data are prerecorded;

a processing component for establishing coordinate values for objects in three-dimensional virtual space based on the shape data stored in said shape memory;

conversion means for receiving the coordinate values established by said processing component, and for converting the coordinate values to a visual field coordinate system based on a prescribed view point;

audio generating means for generating sounds based on the position of said objects in the three-dimensional virtual space;

view point establishment means for establishing the position of said view point on the basis of the sound generating state of said audio generating means; and image means for adding desired texture to the shape data of the visual field coordinate system converted by said conversion means; wherein said view point establishment means directs the line of vision from said view point in the direction in which sounds are generated.

2. An image processing method, comprising:

a first step for establishing the coordinate values of objects in three-dimensional virtual space on the basis of prerecorded object shape data;

a second step for generating sounds on the basis of the position of said objects in the three-dimensional virtual space;

a third step for establishing the position of said view point on the basis of the sound generating state in said second step;

a fourth step for receiving the coordinate values established in said first step, and for converting the coordinate values to a visual field coordinate system based on the view point established in said third step;

a fifth step for adding desired texture to the shape data of the visual field coordinate system converted in said fourth step; and a sixth step of directing a line of vision from the position of the view point established in the third step in the direction in which the sound is generated in the second step.

3. The medium on which has been recorded a program for executing said first through fifth steps according to claim 2 on a computer.

4. A game machine for simulated games that can be played by a plurality of players, said game machine comprising:

input means operated by said players;

shape memory means in which object shape data are prerecorded;

a processing component for establishing coordinate values for objects in three-dimensional virtual space based on the shape data stored in said shape memory and signals from said input means;

conversion means for receiving the coordinate values established by said processing component, and for converting the coordinate values to a visual field coordinate system based on a prescribed view point;

imaging means for adding predetermined texture to the shape data of the visual field coordinate system converted by said conversion means;

display means for displaying the imaging output of said imaging means;

back-up score calculating means for dividing the screen of said display means into a plurality of areas corresponding to said plurality of players, for matching the plurality of divided areas with said plurality of players, and for calculating the back-up score on the basis of the shooting results on a player's own screen and the shooting results on another player's screen; and rating means for rating players according to said back-up score.

5. The game machine according to claim 4, characterized by comprising screen switching means for switching between a subjective screen as viewed from said player and an objective screen where part of the player is displayed on said screen.

6. The medium on which is recorded a program allowing a computer to function as the processing component, conversion means, view point establishment means, imaging means, and back-up score calculating means according to claim 4.

7. The game machine according to claim 4, characterized by comprising switch display means for displaying a switch on said screen, and for switching the screen when the switch is struck by said input means.

8. The game machine according to claim 7, characterized by comprising storyline generating means for displaying a prescribed mark on said screen, and for changing the way the game storyline unfolds when the mark is struck by said input means.

9. A game machine, comprising position calculating means for calculating in real time the coordinate positions of peripheral devices relative to the display screen, and presentation conversion means for converting a game presentation displayed on the display screen on the basis of the calculated results, said peripheral devices include a game gun, a photoreceptor element is disposed near a muzzle of the game gun, the photoreceptor element receives light emitted from the display screen and generates a prescribed photoreceptor signal, said calculating means calculates the position coordinates for the muzzle of the game gun relative to said display screen according to the photoreceptor signal, and a recoil generating device for simulating recoil when said game gun is fired, wherein said recoil generating device is air driven.

10. The game machine according to claim 9, characterized in that said recoil generating device comprises a cylinder, an inertia member which moves inside the cylinder, an air inlet which is connected to the cylinder and through which said inertia member is moved to generate recoil when air is compressed, and an elastic member for returning said inertia member to the position in which it was before it was moved.

* * * * *